US012683654B2

(12) United States Patent
Rahman et al.

(10) Patent No.: US 12,683,654 B2
(45) Date of Patent: Jul. 14, 2026

(54) UPLINK TRANSMISSIONS AND RECEPTIONS

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/822,056

(22) Filed: Aug. 30, 2024

(65) Prior Publication Data

US 2025/0105886 A1      Mar. 27, 2025

Related U.S. Application Data

(60) Provisional application No. 63/640,700, filed on Apr. 30, 2024, provisional application No. 63/538,383, filed on Sep. 14, 2023.

(51) Int. Cl.
H04L 1/02 (2006.01)
H04B 7/0456 (2017.01)

(52) U.S. Cl.
CPC .................................. H04B 7/0456 (2013.01)

(58) Field of Classification Search
CPC ............................ H04B 7/0456; H04B 7/0404
USPC ........................................................ 375/267
See application file for complete search history.

(56) References Cited

U.S. PATENT DOCUMENTS

| | | | | |
|---|---|---|---|---|
| 11,271,626 | B2 * | 3/2022 | Rahman | ............... H04B 7/0486 |
| 2020/0204225 | A1 * | 6/2020 | Huang | ................. H04B 7/0628 |
| 2020/0351129 | A1 * | 11/2020 | Kwak | ................... H04W 76/27 |
| 2020/0383062 | A1 * | 12/2020 | Wang | ................. H04L 25/0226 |
| 2021/0314037 | A1 | 10/2021 | Rahman et al. | |
| 2022/0166475 | A1 | 5/2022 | Park et al. | |
| 2023/0081552 | A1 | 3/2023 | Chou et al. | |

OTHER PUBLICATIONS

International Search Report and Written Opinion issued Dec. 10, 2024 regarding International Application No. PCT/KR2024/013629, 9 pages.
Qualcomm Incorporated, "Enhancements for 8 Tx UL transmissions", 3GPP TSG RAN WG1 #114, R1-2307913, Aug. 2023, 24 pages.
Nokia et al., "UL enhancements for enabling 8Tx UL transmission", 3GPP TSG RAN WG1 Meeting #114, R1-2308328, Aug. 2023, 35 pages.

(Continued)

*Primary Examiner* — Helene E Tayong

(57) ABSTRACT

Apparatuses and methods for uplink (UL) transmissions and receptions. A method performed by a user equipment (UE). The method includes transmitting capability information about an UL codebook for 3 antenna ports; receiving a configuration indicating a sounding resource signal (SRS) resource set including at least one SRS resource with 4 SRS ports, wherein one of the 4 SRS ports is muted; and transmitting a SRS from 3 of the 4 SRS ports. The method further includes receiving an indication indicating a transmit precoding matrix indicator (TPMI) for transmission of a physical uplink shared channel (PUSCH) and transmitting the PUSCH based on the indicated TPMI. The TPMI indicates a precoding matrix from the UL codebook for the 3 antenna ports.

17 Claims, 6 Drawing Sheets

(56) References Cited

OTHER PUBLICATIONS

"LTE; Evolved Universal Terrestrial Radio Access (E-UTRA); Physical channels and modulation (3GPP TS 36.211 version 17.1.0 Release 17)", ETSI TS 136 211 V17.1.0, May 2022, 252 pages.

"LTE; Evolved Universal Terrestrial Radio Access (E-UTRA); Multiplexing and channel coding (3GPP TS 36.212 version 17.1.0 Release 17)", ETSI TS 136 212 V17.1.0, Apr. 2022, 264 pages.

"LTE; Evolved Universal Terrestrial Radio Access (E-UTRA); Physical layer procedures (3GPP TS 36.213 version 17.1.0 Release 17)", ETSI TS 136 213 V17.1.0, May 2022, 586 pages.

"LTE; Evolved Universal Terrestrial Radio Access (E-UTRA); Medium Access Control (MAC) protocol specification (3GPP TS 36.321 version 17.1.0 Release 17)", ETSI TS 136 321 V17.1.0, Aug. 2022,147 pages.

"LTE; Evolved Universal Terrestrial Radio Access (E-UTRA); Radio Resource Control (RRC); Protocol specification (3GPP TS 36.331 version 17.1.0 Release 17)", ETSI TS 136 331 V17.1.0, Aug. 2022, 1135 pages.

"3rd Generation Partnership Project; Technical Specification Group Radio Access Network; NR; Physical channels and modulation (Release 17)", 3GPP TS 38.211 V17.1.0, Mar. 2022, 135 pages.

"3rd Generation Partnership Project; Technical Specification Group Radio Access Network; NR; Multiplexing and channel coding (Release 17)", 3GPP TS 38.212 V17.1.0, Mar. 2022, 197 pages.

"3rd Generation Partnership Project; Technical Specification Group Radio Access Network; NR; Physical layer procedures for control (Release 17)", 3GPP TS 38.213 V17.1.0, Mar. 2022, 245 pages,.

"3rd Generation Partnership Project; Technical Specification Group Radio Access Network; NR; Physical layer procedures for data (Release 17)", 3GPP TS 38.214 V17.1.0, Mar. 2022, 225 pages.

5G; NR; Physical layer measurements (3GPP TS 38.215 version 17.1.0 Release 17), ETSI TS 138 215 V17.1.0, Apr. 2022, 32 pages.

"5G; NR; Medium Access Control (MAC) protocol specification (3GPP TS 38.321 version 17.1.0 Release 17)", ETSI TS 138 321 V17.1.0 , Aug. 2022, 244 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

* cited by examiner

UPLINK TRANSMISSIONS AND RECEPTIONS

CROSS-REFERENCE TO RELATED APPLICATION AND CLAIM OF PRIORITY

This application claims priority under 35 U.S.C. § 119(e) to U.S. Provisional Patent Application No. 63/538,383 filed on Sep. 14, 2023 and U.S. Provisional Patent Application No. 63/640,700 filed on Apr. 30, 2024. These provisional patent applications are hereby incorporated by reference in their entirety.

TECHNICAL FIELD

The present disclosure relates generally to wireless communication systems and, more specifically, to uplink (UL) transmissions and receptions.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for UL transmissions and receptions.

In one embodiment, a user equipment (UE) is provided. The UE includes a processor and a transceiver operably coupled to the processor. The transceiver configured to transmit capability information about an uplink (UL) codebook for 3 antenna ports, receive a configuration indicating a sounding resource signal (SRS) resource set comprising at least one SRS resource with 4 SRS ports, wherein one of the 4 SRS ports is muted, transmit a SRS from 3 of the 4 SRS ports, receive an indication indicating a transmit precoding matrix indicator (TPMI) for transmission of a physical uplink shared channel (PUSCH), and transmit the PUSCH based on the indicated TPMI. The TPMI indicates a precoding matrix from the UL codebook for the 3 antenna ports.

In another embodiment, a base station (BS) is provided. The BS includes a processor and a transceiver operably coupled to the processor. The transceiver configured to receive capability information about an UL codebook for 3 antenna ports, transmit a configuration indicating a SRS resource set comprising at least one SRS resource with 4 SRS ports, wherein one of the 4 SRS ports is muted, receive a SRS from 3 of the 4 SRS ports, transmit an indication indicating a TPMI for transmission of a PUSCH, and receive the PUSCH based on the indicated TPMI. The TPMI indicates a precoding matrix from the UL codebook for the 3 antenna ports.

In yet another embodiment, a method performed by a UE. The method includes transmitting capability information about an UL codebook for 3 antenna ports; receiving a configuration indicating a SRS resource set comprising at least one SRS resource with 4 SRS ports, wherein one of the 4 SRS ports is muted; and transmitting a SRS from 3 of the 4 SRS ports. The method further includes receiving an indication indicating a TPMI for transmission of a PUSCH and transmitting the PUSCH based on the indicated TPMI. The TPMI indicates a precoding matrix from the UL codebook for the 3 antenna ports.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
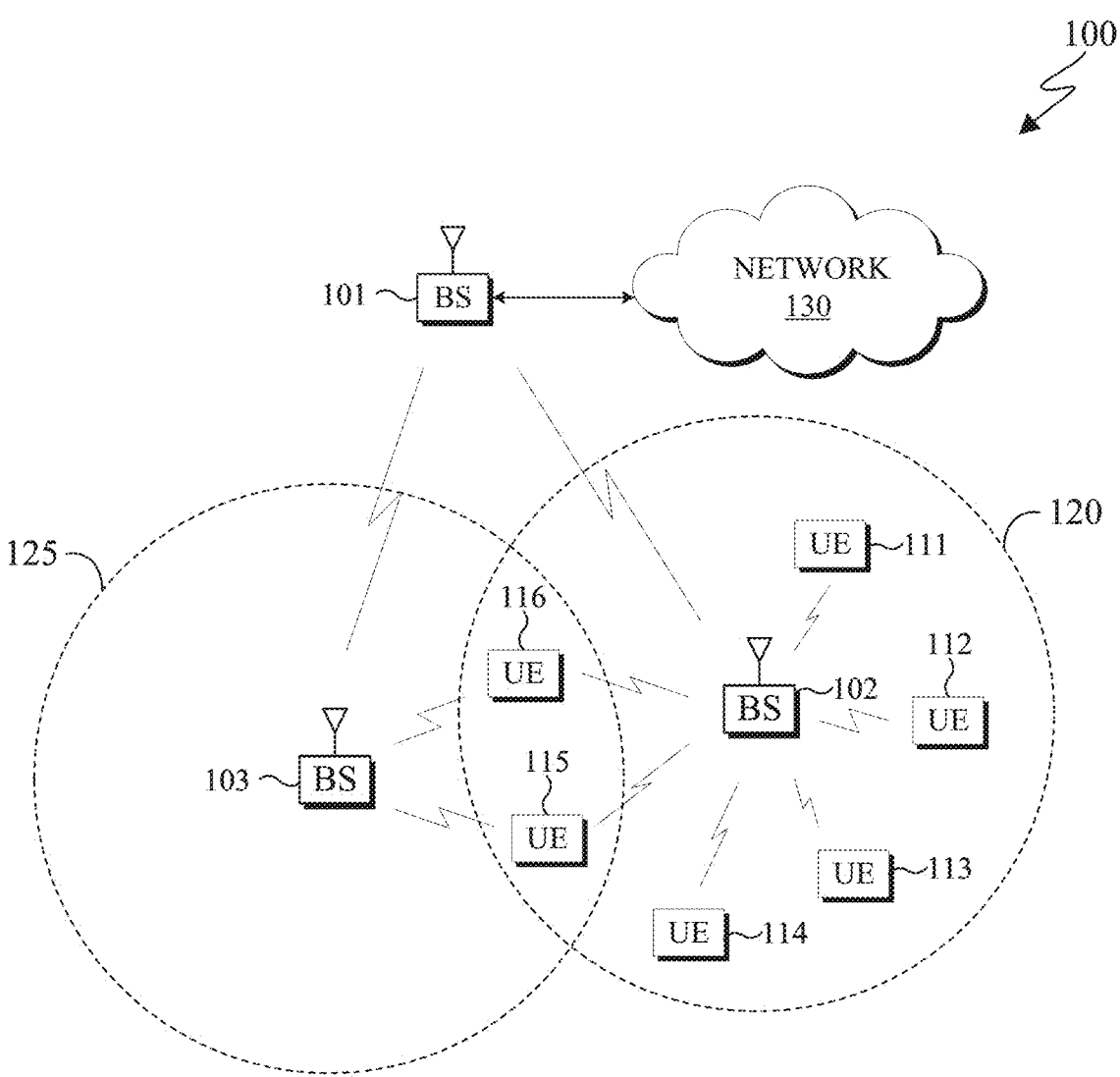
FIG. 1 illustrates an example wireless network according to embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.1.0, "E-UTRA, Physical channels and modulation (herein "REF 1");" 3GPP TS 36.212 v17.1.0, "E-UTRA, Multiplexing and Channel coding" (herein "REF 2"); 3GPP TS 36.213 v17.1.0, "E-UTRA, Physical Layer Procedures" (herein "REF 3"); 3GPP TS 36.321 v17.1.0, "E-UTRA, Medium Access Control (MAC) protocol specification" (herein "REF 4"); 3GPP TS 36.331 v17.1.0, "E-UTRA, Radio Resource Control (RRC) Protocol Specification" (herein "REF 5"); 3GPP TS 38.211 v17.1.0, "NR, Physical channels and modulation" (herein "REF 6"); 3GPP TS 38.212 v17.1.0, "E-UTRA, NR, Multiplexing and Channel coding" (herein "REF 7"); 3GPP TS 38.213 v17.1.0, "NR, Physical Layer Procedures for Control" (herein "REF 8"); 3GPP TS 38.214 v17.1.0, "E-UTRA, NR, Physical layer procedures for data" (herein "REF 9"); 3GPP TS 38.215 v17.1.0, "NR, Physical Layer Measurements" (herein "REF 10"); 3GPP TS 38.321 v17.1.0, "NR, Medium Access Control (MAC) protocol specification" (herein "REF 11"); and 3GPP TS 38.331 v17.1.0, "NR, Radio Resource Control (RRC) Protocol Specification" (herein "REF 12").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive MIMO, full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
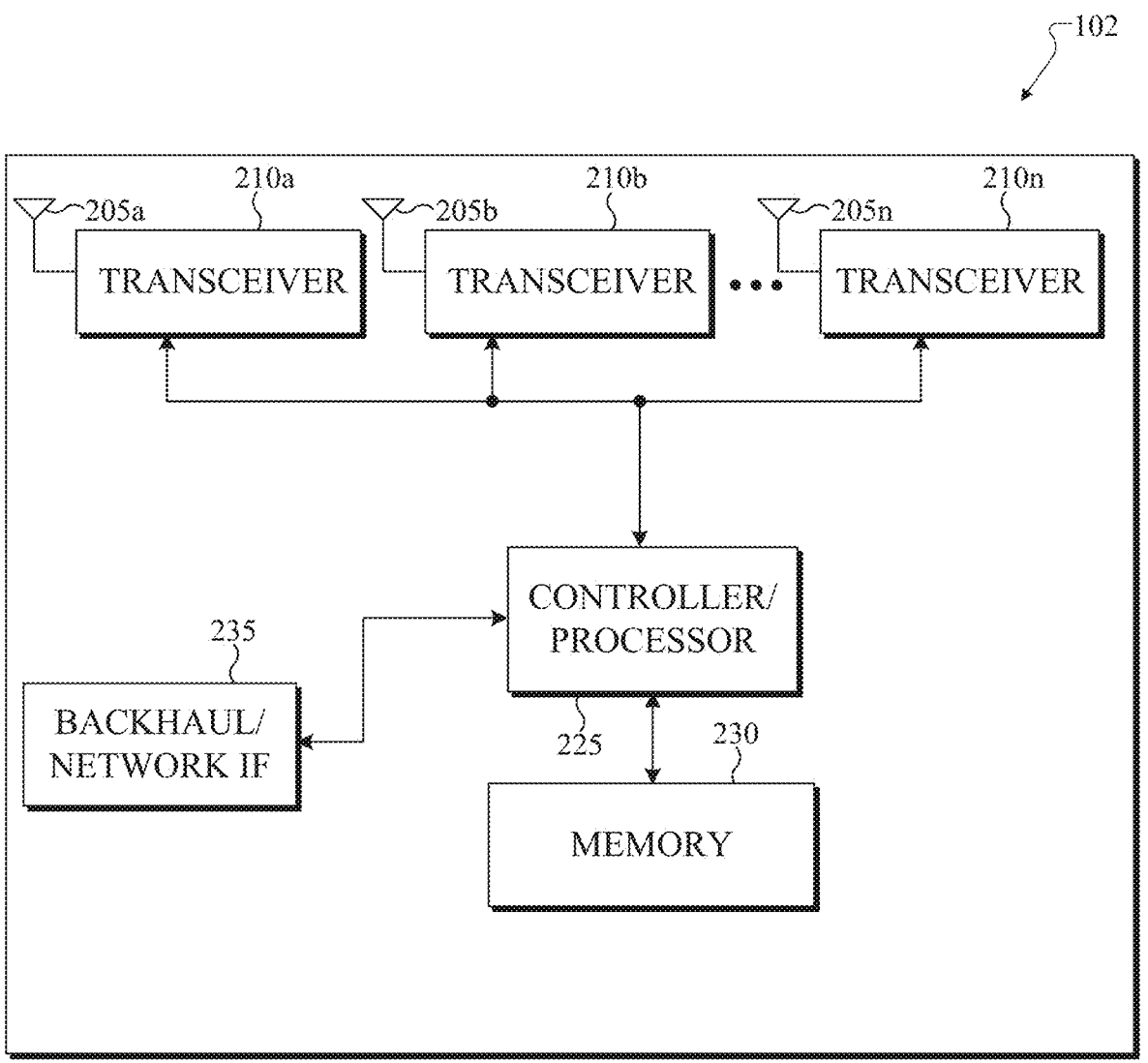
FIG. 2 illustrates an example gNodeB (gNB) according to embodiments of the present disclosure.
Figure 3:
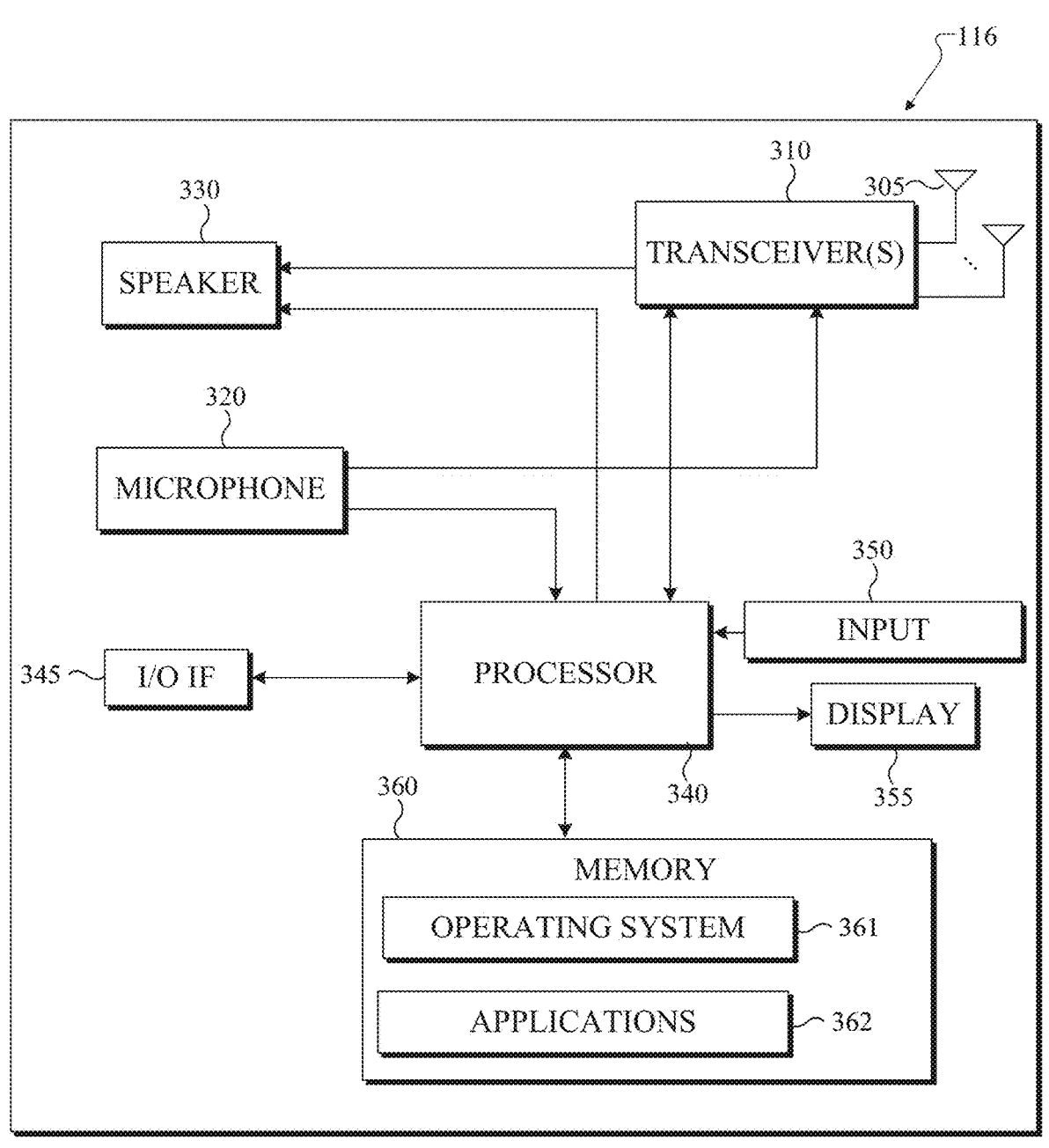
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for UL transmissions. In certain embodiments, one or more of the BSs 101-103 include circuitry, programing, or a combination thereof for UL receptions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting reception of PUSCH based on 3 antenna ports. Any of a wide variety of other functions could be supported in the gNB 102 by the controller/processor 225.

The controller/processor 225 is also capable of executing programs and other processes resident in the memory 230, such as processes for UL receptions. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for UL transmissions. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
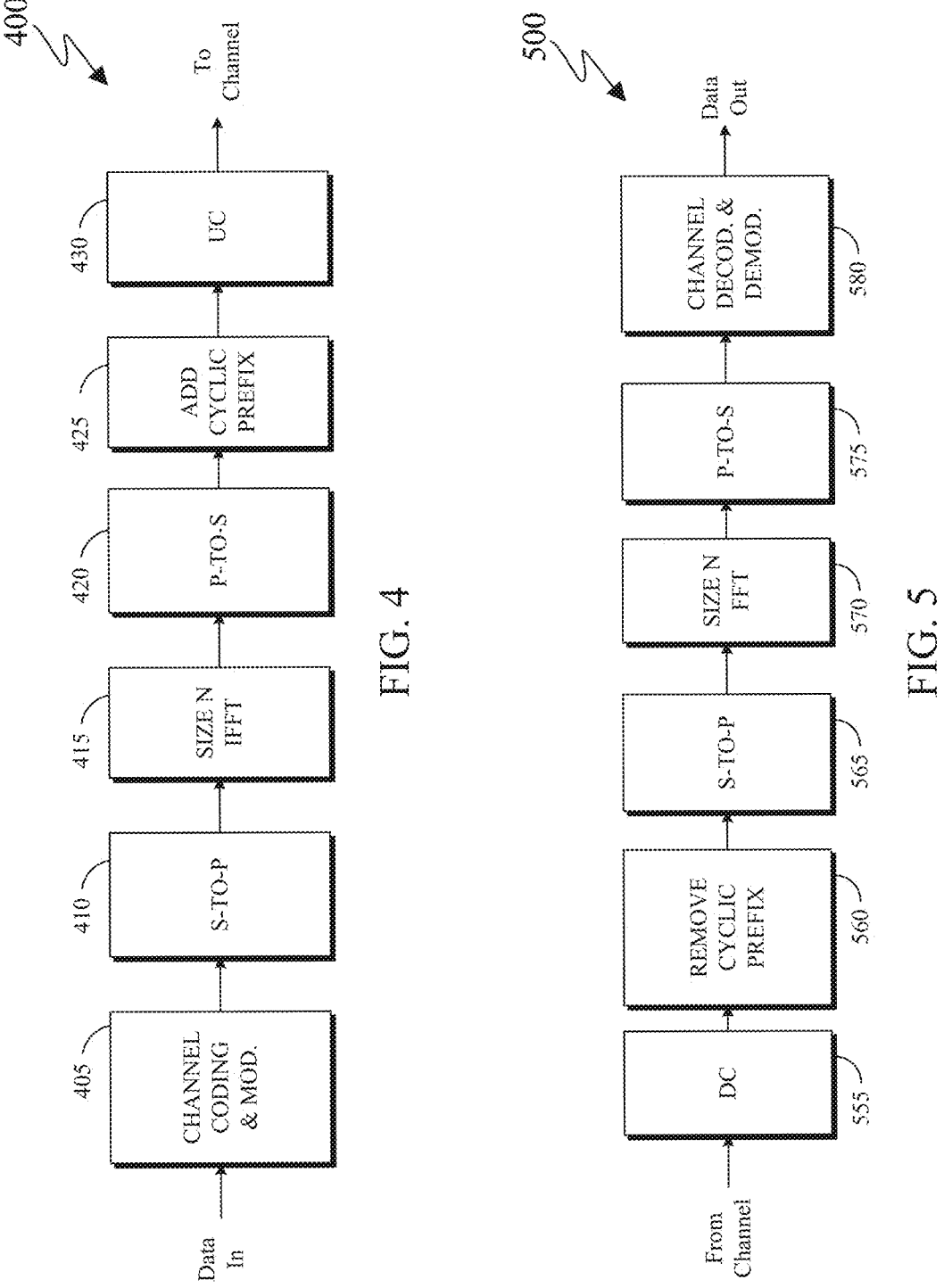
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the transmit path 400 is configured to support use of UL transmissions as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Embodiments of the present disclosure recognize that the 3GPP specification (such as 4G LTE and 5G NR) supports up to 32 CSI-RS antenna ports which enable an eNB (or gNB) to be equipped with a large number of antenna elements (such as 64 or 128). In this case, a plurality of antenna elements is mapped onto one CSI-RS port. For cellular systems such as 5G, the maximum number of CSI-RS ports can either remain the same or increase. For UL transmission, the 3GPP specification supports 1, 2, or 4 SRS antenna ports in one SRS resource, where each SRS antenna port can be mapped to one or multiple antenna elements at the UE.

Figure 6:
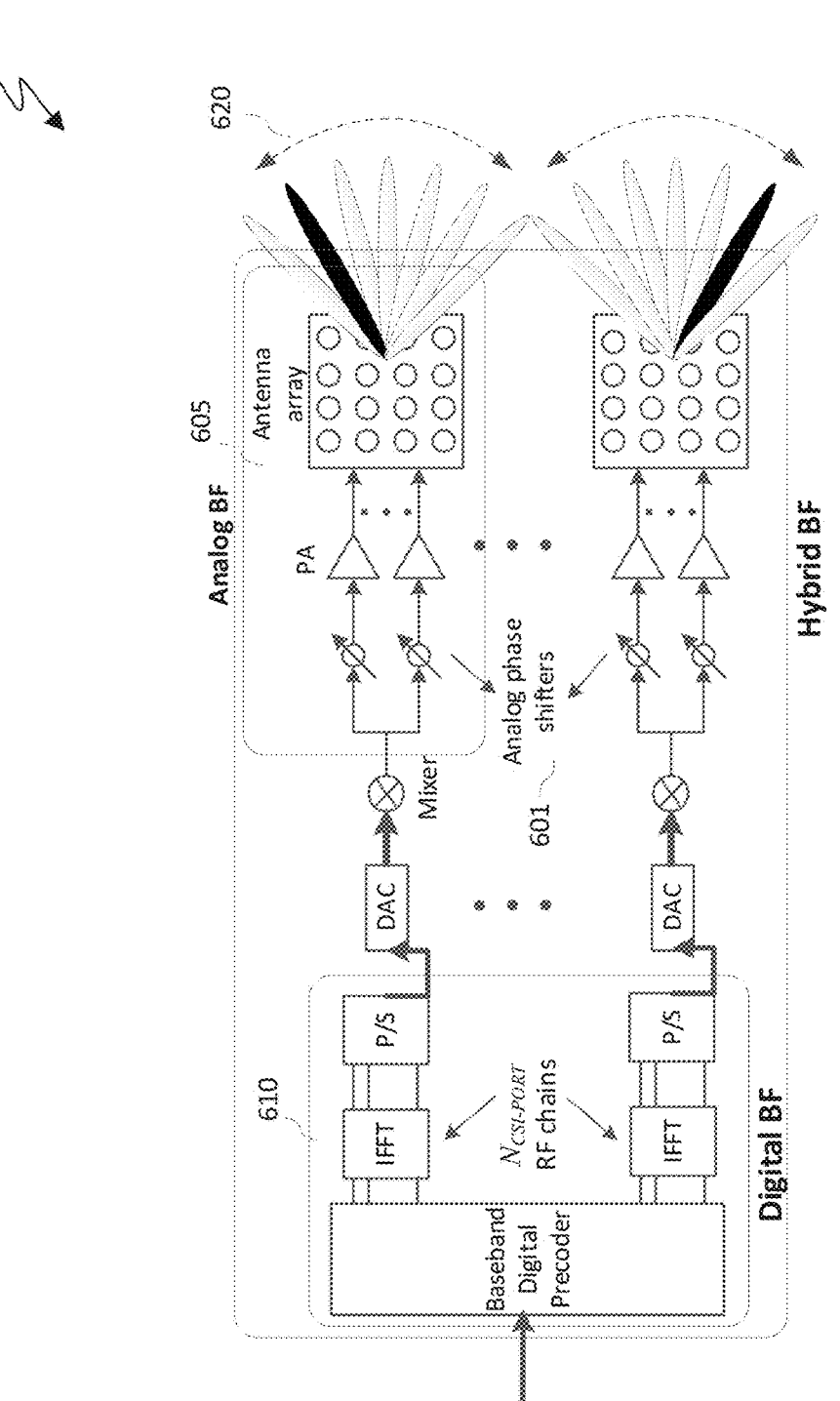
FIG. 6 illustrates an example antenna blocks or arrays forming beams according to embodiments of the present disclosure.

FIG. 6 illustrates an example antenna blocks or arrays 600 according to embodiments of the present disclosure. The embodiment of the antenna blocks or arrays 600 illustrated in FIG. 6 is for illustration only. FIG. 6 does not limit the scope of this disclosure to any particular implementation of the antenna blocks or arrays.

For mm Wave bands, although the number of antenna elements can be larger for a given form factor, the number of CSI-RS (likewise SRS) ports—which can correspond to the number of digitally precoded ports-tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes (or slots). The number of sub-arrays (equal to the number of RF chains) is the same as the number of antenna ports $N_{PORT}$. A digital beamforming unit 610 performs a linear combination across $N_{PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

The present disclosure relates generally to wireless communication systems and, more specifically, to UL transmission based on a codebook. Embodiments of the present disclosure recognize that, in NR, two transmission schemes are supported for PUSCH: codebook-based transmission and non-codebook-based transmission. The UE is configured with codebook based transmission when the higher layer parameter txConfig in pusch-Config is set to 'codebook', the UE is configured non-codebook based transmission when the higher layer parameter txConfig is set to 'nonCodebook'.

According to Section 6.1.1.1 [REF9], the following is supported for codebook based UL transmission.

For codebook-based transmission, PUSCH can be scheduled by DCI format 0_0, DCI format 0_1, DCI format 0_2 or semi-statically configured to operate according to Clause 6.1.2.3 [REF9]. If this PUSCH is scheduled by DCI format 0_1, DCI format 0_2, or semi-statically configured to operate according to Clause 6.1.2.3 [REF9], the UE determines its PUSCH transmission precoder based on SRI, TPMI and the transmission rank, where the SRI, TPMI and the transmission rank are given by DCI fields of SRS resource indicator and Precoding information and number of layers in clause 7.3.1.1.2 and 7.3.1.1.3 of [5, REF] for DCI format 0_1 and 0_2 or given by srs-ResourceIndicator and precodingAndNumberOfLayers according to clause 6.1.2.3. The SRS-ResourceSet(s) applicable for PUSCH scheduled by DCI format 0_1 and DCI format 0_2 are defined by the entries of the higher layer parameter srs-ResourceSetToAddModList and srs-ResourceSetToAddModListDCI-0-2 in SRS-config, respectively. Only one SRS resource set can be configured in srs-ResourceSetToAddModList with higher layer parameter usage in SRS-ResourceSet set to 'codebook', and only one SRS resource set can be configured in srs-ResourceSetToAddModListDCI-0-2 with higher layer parameter usage in SRS-ResourceSet set to 'codebook'. The TPMI is used to indicate the precoder to be applied over the layers $\{0 \ldots v-1\}$ and that corresponds to the SRS resource selected by the SRI when multiple SRS resources are configured, or if a single SRS resource is configured TPMI is used to indicate the precoder to be applied over the layers $\{0 \ldots v-1\}$ and that corresponds to the SRS resource. The transmission precoder is selected from the uplink codebook that has a number of antenna ports equal to higher layer parameter nrofSRS-Ports in SRS-Config, as defined in Clause 6.3.1.5 of [4, TS 38.211]. When the UE is configured with the higher layer parameter txConfig set to 'codebook', the UE is configured with at least one SRS resource. The indicated SRI in slot n is associated with the most recent transmission of SRS resource identified by the SRI, where the SRS resource is prior to the PDCCH carrying the SRI.

For codebook-based transmission, the UE determines its codebook subsets based on TPMI and upon the reception of higher layer parameter codebookSubset in pusch-Config for PUSCH associated with DCI format 0_1 and codebookSubsetDCI-0-2 in pusch-Config for PUSCH associated with DCI format 0_2 which may be configured with 'fullyAndPartialAndNonCoherent', or 'partialAndNonCoherent', or 'nonCoherent' depending on the UE capability. When higher layer parameter ul-FullPowerTransmission is set to 'fullpowerMode2' and the higher layer parameter codebook-Subset or the higher layer parameter codebookSubsetForDCI-Format0-2 is set to 'partialAndNonCoherent', and when the SRS-resourceSet with usage set to "codebook" includes at least one SRS resource with 4 ports and one SRS resource with 2 ports, the codebookSubset associated with the 2-port SRS resource is 'nonCoherent'. The maximum transmission rank may be configured by the higher layer parameter maxRank in pusch-Config for PUSCH scheduled with DCI format 0_1 and maxRank-ForDCIFormat0_2 for PUSCH scheduled with DCI format 0_2.

A UE reporting its UE capability of 'partialAndNonCoherent' transmission does not expect to be configured by either codebookSubset or codebookSubsetForDCI-Format0-2 with 'fullyAndPartialAndNonCoherent'.

A UE reporting its UE capability of 'nonCoherent' transmission does not expect to be configured by either codebookSubset or codebookSubsetForDCI-Format0-2 with 'fullyAndPartialAndNonCoherent' or with 'partialAndNonCoherent'.

A UE does not expect to be configured with the higher layer parameter codebookSubset or the higher layer parameter codebookSubsetForDCI-Format0-2 set to 'partialAnd- NonCoherent' when higher layer parameter nrofSRS-Ports in an SRS-ResourceSet with usage set to 'codebook' indicates that the maximum number of the configured SRS antenna ports in the SRS-ResourceSet is two.

For codebook-based transmission, only one SRS resource can be indicated based on the SRI from within the SRS resource set. Except when higher layer parameter ul-Full-PowerTransmission is set to 'fullpowerMode2', the maximum number of configured SRS resources for codebook-based transmission is 2. If aperiodic SRS is configured for a UE, the SRS request field in DCI triggers the transmission of aperiodic SRS resources.

A UE does not expect to be configured with higher layer parameter ul-FullPowerTransmission set to 'fullpowerMode1' and codebookSubset or codebookSubsetDCI-0-2 set to 'fullAndPartialAndNonCoherent' simultaneously.

The UE transmits PUSCH using the same antenna port(s) as the SRS port(s) in the SRS resource indicated by the DCI format 0_1 or 0_2 or by configuredGrantConfig according to clause 6.1.2.3.

The DM-RS antenna ports $\{\tilde{p}_0, \ldots, \tilde{p}_{v-1}\}$ in Clause 6.4.1.1.3 of [4, TS38.211] are determined according to the ordering of DM-RS port(s) given by Tables 7.3.1.1.2-6 to 7.3.1.1.2-23 in Clause 7.3.1.1.2 of [5, TS 38.212].

Except when higher layer parameter ul-FullPowerTransmission is set to 'fullpowerMode2', when multiple SRS resources are configured by SRS-ResourceSet with usage set to 'codebook', the UE expects that higher layer parameters nrofSRS-Ports in SRS-Resource in SRS-ResourceSet is configured with the same value for all these SRS resources.

In this disclosure, 'fullAndPartialAndNonCoherent', 'partialAndNonCoherent', and 'Non-Coherent' are referred to codebookSubsets depending on three coherence type/capability, where the term 'coherence' implies all or a subset of antenna ports at the UE that can be used to transmit a layer coherently. In particular, the term 'full-coherence' (FC) implies all antenna ports at the UE that can be used to transmit a layer coherently.

the term 'partial-coherence' (PC) implies a subset (at least two but less than all) of antenna ports at the UE that can be used to transmit a layer coherently.

the term 'non-coherence' (NC) implies only one antenna port at the UE that can be used to transmit a layer.

When the UE is configured with codebookSubset='fullAndPartialAndNonCoherent', the UL codebook includes all three types (FC, PC, NC) of precoding matrices; when the UE is configured with codebookSubset='partialAndNonCoherent', the UL codebook includes two types (PC, NC) of precoding matrices; and when the UE is configured with codebookSubset='nonCoherent', the UL codebook includes only one type (NC) of precoding matrices.

According to Section 6.3.1.5 of REF7, for non-codebook-based UL transmission, the precoding matrix W equals the identity matrix. For codebook-based UL transmission, the precoding matrix W is given by W=1 for single-layer transmission on a single antenna port, otherwise by Table 1 to Table 6, which are copied below.

The rank (or number of layers) and the corresponding precoding matrix W are indicated to the UE using TRI and TPMI, respectively. In one example, this indication is joint via a field 'Precoding information and number of layers' in DCI, e.g., using DCI format 0_1. In another example, this indication is via higher layer RRC signaling. In one example, the mapping between a field 'Precoding information and number of layers' and TRI/TPMI is according to
Section 7.3.1.1.2 of [REF10].

TABLE 1

Precoding matrix W for single-layer transmission using two antenna ports.

| TPMI index | W (ordered from left to right in increasing order of TPMI index) | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}1\\0\end{bmatrix}$ | $\frac{1}{\sqrt{2}}\begin{bmatrix}1\\0\end{bmatrix}$ | $\frac{1}{\sqrt{2}}\begin{bmatrix}1\\0\end{bmatrix}$ | $\frac{1}{\sqrt{2}}\begin{bmatrix}1\\0\end{bmatrix}$ | $\frac{1}{\sqrt{2}}\begin{bmatrix}1\\0\end{bmatrix}$ | $\frac{1}{\sqrt{2}}\begin{bmatrix}1\\0\end{bmatrix}$ | $\frac{1}{\sqrt{2}}\begin{bmatrix}1\\0\end{bmatrix}$ |

TABLE 2

Precoding matrix W for single-layer transmission using four antenna ports with transform
precoding disabled

| TPMI index | | W (ordered from left to right in increasing order of TPMI index) | | | | | | |
|---|---|---|---|---|---|---|---|---|
| 0-7 | 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ |
| 8-15 | 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ |
| 16-23 | 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ |
| 24-27 | 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | — | — | — |

40

TABLE 3

Precoding matrix W for two-layer transmission using two antenna ports with transform
precoding disabled

| TPMI index | W (ordered from left to right in increasing order of TPMI index) | | |
|---|---|---|---|
| 0-2 | $\frac{1}{\sqrt{2}}\begin{bmatrix}1&0\\0&1\end{bmatrix}$ | $\frac{1}{\sqrt{2}}\begin{bmatrix}1&1\\1&-1\end{bmatrix}$ | $\frac{1}{\sqrt{2}}\begin{bmatrix}1&1\\j&-j\end{bmatrix}$ |

TABLE 4

Precoding matrix W for two-layer transmission using four antenna ports with transform precoding disabled

| TPMI index | W (ordered from left to right in increasing order of TPMI index) | | | |
|---|---|---|---|---|
| 0-3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2\sqrt{2}}\begin{bmatrix}1&1\\1&1\\1&-1\\1&-1\end{bmatrix}$ | $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ | $\frac{1}{2\sqrt{2}}\begin{bmatrix}1&1\\j&j\\j&-j\\-1&1\end{bmatrix}$ | $\frac{1}{2\sqrt{2}}\begin{bmatrix}1&1\\-1&-1\\1&-1\\-1&1\end{bmatrix}$ | $\frac{1}{2\sqrt{2}}\begin{bmatrix}1&1\\-1&-1\\j&-j\\-j&j\end{bmatrix}$ |
| 20-21 | $\frac{1}{2\sqrt{2}}\begin{bmatrix}1&1\\-j&-j\\1&-1\\-j&j\end{bmatrix}$ | $\frac{1}{2\sqrt{2}}\begin{bmatrix}1&1\\-j&-j\\j&-j\\1&-1\end{bmatrix}$ | — | — |

35

TABLE 5

Precoding matrix W for three-layer transmission using four antenna ports with transform precoding disabled

| TPMI index | W (ordered from left to right in increasing order of TPMI index) | | | |
|---|---|---|---|---|
| 0-3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ | $\frac{1}{2\sqrt{3}}\begin{bmatrix}1&1&1\\1&-1&1\\1&1&-1\\1&-1&-1\end{bmatrix}$ |
| 4-6 | $\frac{1}{2\sqrt{3}}\begin{bmatrix}1&1&1\\1&-1&1\\j&j&-j\\j&-j&-j\end{bmatrix}$ | $\frac{1}{2\sqrt{3}}\begin{bmatrix}1&1&1\\-1&1&-1\\1&1&-1\\-1&1&1\end{bmatrix}$ | $\frac{1}{2\sqrt{3}}\begin{bmatrix}1&1&1\\-1&1&-1\\j&j&-j\\-j&j&j\end{bmatrix}$ | — |

55

TABLE 6

Precoding matrix W for four-layer transmission using four antenna ports with transform precoding disabled

| TPMI index | W (ordered from left to right in increasing order of TPMI index) |
|---|---|
| 0-3 | $\dfrac{1}{2}\begin{bmatrix}1&0&0&0\\0&1&0&0\\0&0&1&0\\0&0&0&1\end{bmatrix}$ $\quad$ $\dfrac{1}{2\sqrt{2}}\begin{bmatrix}1&1&0&0\\0&0&1&1\\1&-1&0&0\\0&0&1&-1\end{bmatrix}$ $\quad$ $\dfrac{1}{2\sqrt{2}}\begin{bmatrix}1&1&0&0\\0&0&1&1\\j&-j&0&0\\0&0&j&-j\end{bmatrix}$ $\quad$ $\dfrac{1}{4}\begin{bmatrix}1&1&1&1\\1&-1&1&-1\\1&1&-1&-1\\1&-1&-1&1\end{bmatrix}$ |
| 4 | $\dfrac{1}{4}\begin{bmatrix}1&1&1&1\\1&-1&1&-1\\j&j&-j&-j\\j&-j&-j&j\end{bmatrix}$ $\quad$ — $\quad$ — $\quad$ — |

The subset of TPMI indices for the three coherence types are summarized in Table 7 and Table 8, where rank=r corresponds to (and is equivalent to) r layers.

TABLE 7

Total power of precoding matrix W for 2 antenna ports

| Rank | Non-Coherent (NC) TPMIs | | Full-Coherent (FC) TPMIs | |
|---|---|---|---|---|
| | TPMI indices | Total power | TPMI indices | Total power |
| 1 | 0-1 | ½ | 2-5 | 1 |
| 2 | 0 | 1 | 1-2 | 1 |

TABLE 8

Total power of precoding matrix W for 4 antenna ports

| Rank | Non-Coherent (NC) TPMIs | | Partial-Coherent (PC) TPMIs | | Full-Coherent (FC) TPMIs | |
|---|---|---|---|---|---|---|
| | TPMI indices | Total power | TPMI indices | Total power | TPMI indices | Total power |
| 1 | 0-3 | ¼ | 4-11 | ½ | 12-27 | 1 |
| 2 | 0-5 | ½ | 6-13 | 1 | 14-21 | 1 |
| 3 | 0 | ¾ | 1-2 | 1 | 3-6 | 1 |
| 4 | 0 | 1 | 1-2 | 1 | 3-4 | 1 |

The corresponding supported codebookSubsets are summarized in Table 9 and Table 10.

TABLE 9

TPMI indices for codebookSubsets for 2 antenna ports

| Rank | Non-Coherent | fullAndPartialAndNonCoherent |
|---|---|---|
| 1 | 0-1 | 0-5 |
| 2 | 0 | 0-2 |

TABLE 10

TPMI indices for codebookSubsets for 4 antenna ports

| Rank | Non-Coherent | partialAndNonCoherent | fullAndPartialAndNonCoherent |
|---|---|---|---|
| 1 | 0-3 | 0-11 | 0-27 |
| 2 | 0-5 | 0-13 | 0-21 |
| 3 | 0 | 0-2 | 0-6 |
| 4 | 0 | 0-2 | 0-4 |

TABLE 10-continued

TPMI indices for codebookSubsets for 4 antenna ports

| Rank | Non-Coherent | partialAndNonCoherent | fullAndPartialAndNonCoherent |
|---|---|---|---|

Embodiments of the present disclosure recognize that, in up to Rel. 17 NR, for UL transmission, the 3GPP specification supports 1, 2, or 4 SRS antenna ports in one SRS resource. In Rel. 18, the number of SRS antenna ports can be 8, targeting devices such as CPE, FWA, and vehicular UEs. For commercial handheld devices (UEs), for example the smart phones in the current market, are generally restricted by 2Tx chains (or antenna ports). Even though 4 Tx chains (or antenna ports) are supported in Rel. 15 NR, 4 Tx chains are not likely to be applied in the commercial handheld UEs in the near future due to various commercial factors, including the PA cost and limited size of commercial cell phones. However, the advanced or next/future generation of smartphones are (or likely to be) capable of supporting 3 Tx chains in one same frequency band, if feasible, this can boost the UL throughput significantly.

This disclosure provides embodiments for potential UL enhancements for UEs with 3 antenna ports. In particular, the present disclosure provides examples of UL codebook, and SRS resource for codebook based PUSCH transmission using 3 antenna ports. The scope of the disclosure is not limited to only these embodiments but includes any extensions or combinations of the proposed embodiments. Besides, example codebooks for 3 antenna ports proposed in this disclosure can also be used for DL (e.g. for CSI/PMI reporting based on 3 CSI-RS antenna ports at NW/gNB), or sidelink (SL) (e.g. for CSI/PMI reporting based on 3 CSI-RS antenna ports at a SL UE/device). It can also be used to configure/trigger a CSI report for network energy saving (NES) applications wherein the NW/gNB may want to trigger (e.g. dynamically via MAC CE or DCI) a sub-configurations of the CSI report in which the number of CSI-RS ports is less than that at the NW/gNB. For instance, NW/gNB may trigger a CSI report for 3 CSI-RS ports that are a subset of >3 (e.g. 4, or 8) CSI-RS ports.

The present disclosure relates to codebook-based UL transmission odd number (e.g. 3, 5, . . . ) of antenna ports. Various embodiments provide for the following:

UL codebook design for odd number of antenna ports that can be grouped into $N_g \in \{1, 2, 3, \ldots\}$ groups Details on codebook design for 3 antenna ports In the following, for brevity, both FDD and TDD are considered as the duplex method for both DL and UL signaling. Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM). This disclosure of invention covers several components which can be used in conjunction or in combination with one another, or can operate as standalone schemes.

Various embodiments of the present disclosure provide for UL transmissions based on a single antenna panel. In this disclosure, a UE with odd number of antenna ports is considered. We assume all antenna ports of the UE can belong to a single antenna panel or group (i.e., they are co-located, for example, at one plane, side, or edge of the UE) or multiple antenna panels or groups. For a given antenna panel or group, $N_1$ and $N_2$ are the number of antenna ports with the same polarization in the first and second dimensions, respectively. For 2D antenna port layouts, we have $N_1>1$, $N_2>1$, and for 1D antenna port layouts, we either have $N_1>1$ and $N_2=1$ or $N_2>1$ and $N_1=1$. In the rest of the disclosure, 1D antenna port layouts with $N_1>1$ and $N_2=1$ is considered. The disclosure, however, is applicable to the other 1D port layouts with $N_2>1$ and $N_1=1$. Also, in the rest of the disclosure, we assume that $N_1 \geq N_2$. The disclosure, however, is applicable to the case when $N_1<N_2$, and the embodiments for $N_1>N_2$ applies to the case $N_1<N_2$ by swapping/switching $(N_1, N_2)$ with $(N_2, N_1)$. For a given antenna panel or group, when a (single-polarized) co-polarized antenna port layout, the total number of antenna ports is $P=N_1 N_2$ and when a dual-polarized antenna port layout, the total number of antenna ports is $P=2N_1 N_2$. When the UE has P=3 antenna ports, an illustration of antenna port layouts is shown in FIG. 7.

Figures 7, 8:
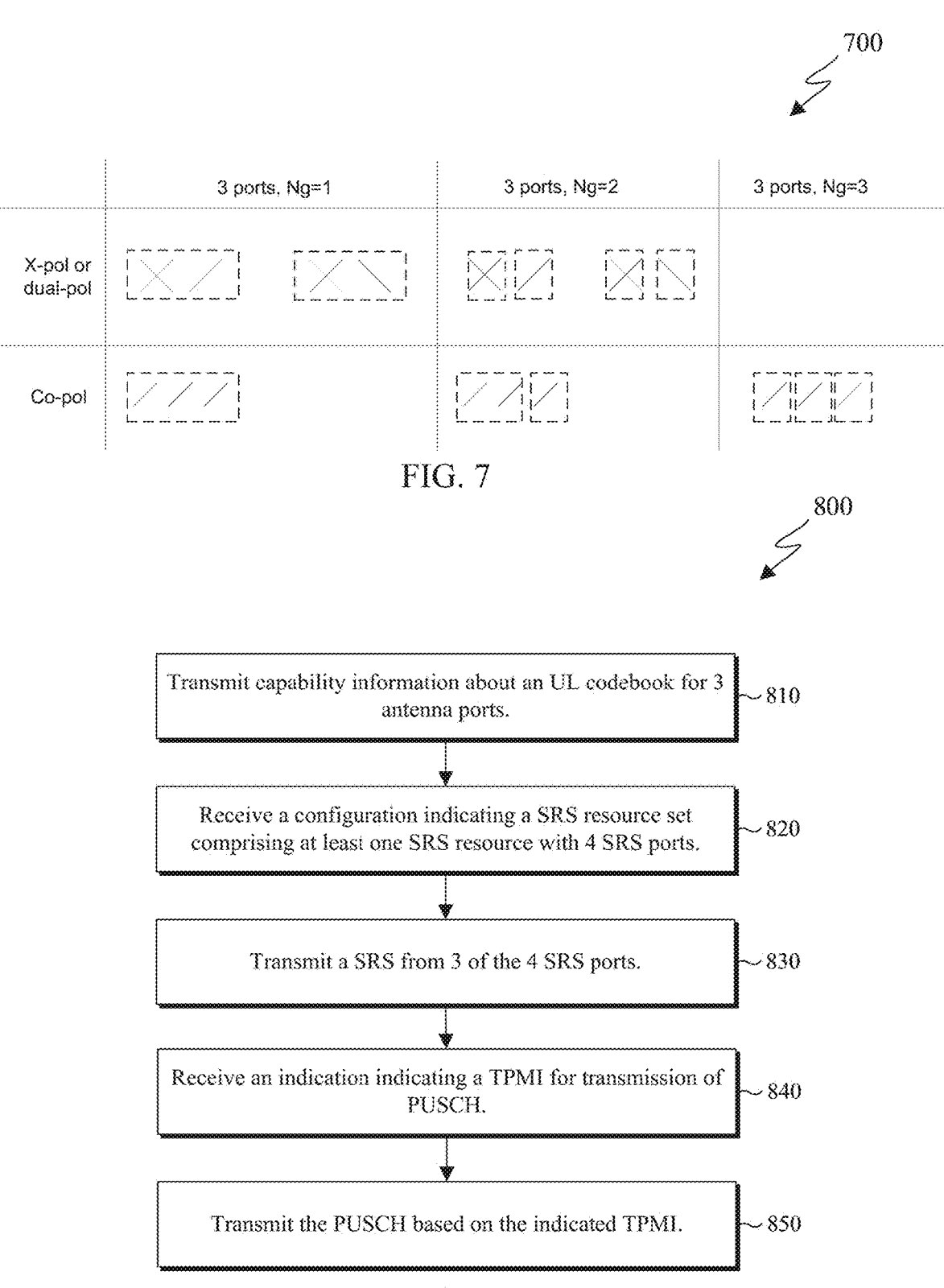
FIG. 7 illustrates examples of port layouts for 3 antenna ports according to embodiments of the present disclosure.
FIG. 8 illustrates an example method performed by a UE in a wireless communication system according to embodiments of the present disclosure.

FIG. 7 illustrates an example of antenna port layouts 700 according to embodiments of the present disclosure. For example, the of antenna port layouts 700 may be implemented in a UE, such as UE 116. The embodiment of the of antenna port layouts 700 illustrated in FIG. 7 is for illustration only. FIG. 7 does not limit the scope of this disclosure to any particular implementation of the antenna blocks or arrays.

Let $N_g$ be the number of antenna port groups (panels). For a co-polarized (single polarized) case, $N_g=1$: one group comprising 3 antenna ports, $N_g=2$: two groups, one comprising 2 antenna ports, and another comprising 1 antenna port, and $N_g=3$: three groups, each comprising 1 antenna port.

For a dual-polarized (cross-polarized) case, $N_g=1$: one group comprising 2 cross-pol antenna ports, and 1 single-pol antenna port.

$N_g=2$: two groups, one comprising 2 cross-pol antenna ports, and another comprising 1 single-pol antenna port.

Let s denote the number of antenna polarizations (or groups of antenna ports with the same polarization). Then, for co-polarized antenna ports, s=1, and for dual- or cross (X)-polarized antenna ports s=2. In one example, the antenna ports at the UE refers to SRS antenna ports (either in one SRS resource or across multiple SRS resources).

The UL codebook W for P antenna ports at the UE is based on pre-coding vectors which are according to one of the three examples in Table 11 depending on whether the antenna ports are co-polarized or a combination of co-polarized and cross-/dual-polarized.

Ex1: corresponds to $N_g=1$ with all co-polarized ports.

Ex2: corresponds to $N_g=2$, 1D antenna layout, $P=P_x+P_{co}$ with $P_x$ cross-pol ports and $P_{co}$ co-polarized ports.

Ex3: corresponds to $N_g=2$, 2D antenna layout, $P_x=2N_{x,1}N_{x,2}$ and $P_{co}=N_{co,1}N_{co,2}$ with $P_x$ cross-pol ports and $P_{co}$ co-polarized ports.

TABLE 11

Pre-coding vectors

Ex1: Co-pol    Ex2: Co-pol + Dual-pol (1D)    Ex3: Co-pol + Dual-pol (2D)

$$W = \frac{w_l}{\sqrt{P}}$$

$$W = \frac{1}{\sqrt{P}} \begin{bmatrix} w_{cross-pol} \\ w_{co-pol} \end{bmatrix} \text{ or } \qquad W = \frac{1}{\sqrt{P}} \begin{bmatrix} w_{cross-pol} \\ w_{co-pol} \end{bmatrix} \text{ or }$$

$$\frac{1}{\sqrt{P}} \begin{bmatrix} w_{co-pol} \\ w_{cross-pol} \end{bmatrix} \qquad \frac{1}{\sqrt{P}} \begin{bmatrix} w_{co-pol} \\ w_{cross-pol} \end{bmatrix}$$

$$w_{cross-pol} = v_{l_1,n} = \begin{bmatrix} w_{l_1} \\ \varphi_n w_{l_1} \end{bmatrix} \qquad w_{cross-pol} = v_{l_1,m,n} = \begin{bmatrix} v_{l_1,m} \\ \varphi_n v_{l_1,m} \end{bmatrix}$$

$$w_{co-pol} = w_{l_2} \qquad w_{co-pol} = v_{l_2,m_2}$$

Here, $v_{l,m}$ is a Kronecker product ($\otimes$) of vectors $w_l$ and $u_m$ of lengths $N_1$ and $N_2$, respectively. In one example, $w_l$ and $u_m$ are oversampled DFT vectors, i.e., $$w_l = \begin{bmatrix} 1 & e^{j\frac{2\pi l}{O_1 N_1}} & e^{j\frac{4\pi l}{O_1 N_1}} & \dots & e^{j\frac{2\pi l(N_1-1)}{O_1 N_1}} \end{bmatrix}^T$$

$$u_m = \begin{cases} \begin{bmatrix} 1 & e^{j\frac{2\pi m}{O_2 N_2}} & \dots & e^{j\frac{2\pi m(N_2-1)}{O_2 N_2}} \end{bmatrix} & N_2 > 1 \\ 1 & N_2 = 1 \end{cases}$$

where $O_1$ and $O_2$ are oversampling factors in two dimensions, and $v_{l,m}$ is then given by $$v_{l,m} = w_l \otimes u_m = \begin{bmatrix} u_m & e^{j\frac{2\pi l}{O_1 N_1}} u_m & \dots & e^{j\frac{2\pi l(N_1-1)}{O_1 N_1}} u_m \end{bmatrix}^T$$

In one example, both $O_1, O_2 \in \{1, 2, 4, 8\}$. In one example, $O_1$ and $O_2$ can take the same values as Rel. 15 NR Type I codebook (cf. 5.2.2.2.1, TS 38.214), i.e., $(O_1, O_2)=(4,4)$ when $N_2>1$, and, i.e., $(O_1, O_2)=(4,1)$ when $N_2=1$. Alternatively, they take different values from the Rel. 15 Type I NR codebook, for example, $(O_1, O_2)=(2,2)$ when $N_2>1$, and, i.e., $(O_1, O_2)=(2,1)$ when $N_2=1$. In one example, $O_1$ and $O_2$ is configurable (e.g. via higher layer). In one example, $(O_1, O_2)=(1,1)$.

The quantity $\varphi_n$ is a co-phase for dual-polarized antenna port layouts. In one example, $\varphi_n=e^{j\pi n/2}$, where $n \in \{0, 1, 2, 3\}$ implying that $\varphi_n$ belongs to QPSK alphabet $\{1, j, -1, -j\}$.

In one example, the values of $N_1$ and $N_2$ are configured, e.g. with the higher layer parameter. A few examples of $(N_1, N_2)$ for a given number of antenna ports (P) and antenna layout (co-pol or/and cross-pol) is given in Table 12. The notation $N_{a,b}$ where $a \in \{co, x\}$ and $b \in \{1,2\}$ is used to denote a number of a-polarized antenna ports in the b-th dimension, respectively.

TABLE 12

| Number of antenna ports, P | Configurations of $(N_1, N_2)$ | | |
|---|---|---|---|
| | Co-pol $(N_{co,1}, N_{co,2})$ | Dual-pol $(N_{x,1}, N_{x,2})$ | Co-Pol + Dual-pol $\{(N_{co,1}, N_{co,2}), (N_{x,1}, N_{x,2})\}$ |
| 1 | (1, 1) | | |
| 2 | (2, 1), (1, 2) | (1, 1) | |
| 3 | (3, 1), (1, 3) | | {(1, 1), (1, 1)} |
| 4 | (4, 1), (1, 4), (2, 2) | (2, 1) | {(2, 1), (1, 1)} {(1, 2), (1, 1)} |
| 5 | (5, 1), (1, 5) | | {(3, 1), (1, 1)} {(1, 3), (1, 1)} {(1, 1), (2, 1)} |
| 6 | (2, 3), (3, 2), (6, 1), (1, 6) | (3, 1) | {(4, 1), (1, 1)} {(1, 4), (1, 1)} {(2, 2), (1, 1)} {(2, 1), (2, 1)} {(1, 2), (2, 1)} |
| 7 | (7, 1), (1, 7) | | {(5, 1), (1, 1)} {(1, 5), (1, 1)} {(3, 1), (2, 1)} {(1, 3), (2, 1)} {(1, 1), (3, 1)} |

In one example, the values of $N_1$ and $N_2$ are fixed for a given number of antenna ports. For example, $(N_1, N_2) = (P, 1)$ for co-pol and $$\left(\frac{P}{2}, 1\right)$$

for dual-pol antenna. In one example, only one $(N_1, N_2)$ is supported for each value of P, where the supported $(N_1, N_2)$ is one of pairs in Table 12.

The number of antenna ports is assumed to be P=3 in various embodiments of the disclosure.

In one example, P=3 antenna ports can be divided into $N_g \in \{1, 2, 3\}$ groups. The value of $(N_{co,1}, N_{co,2})$ or/and $(N_{x,1}, N_{x,2})$ for each of the $N_g$ groups is shown in Table 13.

TABLE 13

| $N_g$ | Group 1 | | Group 2 | | Group 3 | |
|---|---|---|---|---|---|---|
| | $(N_{co,1}, N_{co,2})$ | $(N_{x,1}, N_{x,2})$ | $(N_{co,1}, N_{co,2})$ | $(N_{x,1}, N_{x,2})$ | $(N_{co,1}, N_{co,2})$ | $(N_{x,1}, N_{x,2})$ |
| 1 | (3, 1) | | | | | |
| | (1, 1) | (1, 1) | | | | |
| 2 | (2, 1) | | (1, 1) | | | |
| | | (1, 1) | (1, 1) | | | |
| 3 | (1, 1) | | (1, 1) | | (1, 1) | |

In one example, $N_g = 1$ corresponds to a single antenna panel. In one example, $N_g = 1$ corresponds to a full coherent (FC) UE or FC antenna layout.

In one example, $N_g = 2$ corresponds to two antenna panels. In one example, $N_g = 2$ corresponds to a partial coherent (PC) UE or PC antenna layout.

In one example, $N_g = 3$ corresponds to three antenna panels. In one example, $N_g = 3$ corresponds to a non-coherent (NC) UE or NC antenna layout.

In one example, the 3Tx UL codebook includes all of or a subset of the precoders shown in codebook tables in this disclosure.

In one embodiment, the codebook for 3 antenna ports, as described in previous embodiment (or later embodiments), can also be used/configured (to a UE) for DL (e.g. for CSI/PMI reporting based on 3 CSI-RS antenna ports at NW/gNB), or sidelink (SL) (e.g. for CSI/PMI reporting based on 3 CSI-RS antenna ports at a SL UE/device). It can also be used to configure/trigger a CSI report for network energy saving (NES) applications wherein the NW/gNB may want to trigger (e.g. dynamically via MAC CE or DCI) a sub-configurations of the CSI report in which the number of CSI-RS ports is less than that at the NW/gNB. For instance, NW/gNB may trigger a CSI report for 3 CSI-RS ports that are a subset of >3 (e.g. 4, or 8) CSI-RS ports.

In one example, the rank 1 TPMI (and precoder) can be configured to a UE for both cases when transform precoding is enabled (discrete Fourier transform spread orthogonal frequency domain multiplexing (DFT-s-OFDM)) or disabled (cyclic prefix orthogonal frequency domain multiplexing (CP-OFDM)).

Various embodiments of the present disclosure provide for a 3Tx full coherent codebook design for Ng=1. In one embodiment, the UL codebook includes full-coherent (FC) precoding matrices, and a FC precoding matrix can be defined as a matrix whose all entries are non-zero entries.

In one example, the UL codebook includes FC precoders that are based on length-3 DFT vectors $$p_{1,i} = \begin{bmatrix} 1 \\ e^{j\frac{2\pi i}{3O_1}} \\ e^{j\frac{4\pi i}{3O_l}} \end{bmatrix},$$

$i = 0, 1, \ldots, 3O_1 - 1$. In one example, the oversampling factor $O_1$ is fixed (e.g. 1 or 2 or 4), or configured (via RRC from 1, 2, or 4). In one example, a rank 1 precoder is given by $$\frac{1}{s_1} p_{1,i},$$

where $s_1$ is a scaling factor. Three examples of single-layer (rank 1) FC precoders $(p_{1,i})$ for $O_1 = 1, 2, 4$ are shown in Table 14. The codebook includes all of or a subset of the precoders shown in table 14.

TABLE 14

Example of single-layer FC precoders

| $O_1$ | $P_{1,0}$ | $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ | $P_{1,10}$ | $P_{1,11}$ |
|---|---|---|---|---|---|---|---|---|---|---|---|---|
| 1 | $\begin{bmatrix}1\\1\\1\end{bmatrix}$ | $\begin{bmatrix}1\\e^{j2\pi\frac{1}{3}}\\e^{j2\pi\frac{2}{3}}\end{bmatrix}$ | $\begin{bmatrix}1\\e^{j2\pi\frac{2}{3}}\\e^{j2\pi\frac{4}{3}}\end{bmatrix}$ | | | | | | | | | |
| 2 | $\begin{bmatrix}1\\1\\1\end{bmatrix}$ | $\begin{bmatrix}1\\e^{j2\pi\frac{1}{6}}\\e^{j2\pi\frac{1}{3}}\end{bmatrix}$ | $\begin{bmatrix}1\\e^{j2\pi\frac{1}{3}}\\e^{j2\pi\frac{2}{3}}\end{bmatrix}$ | $\begin{bmatrix}1\\e^{j\pi}\\e^{j2\pi}\end{bmatrix}$ | $\begin{bmatrix}1\\e^{j2\pi\frac{2}{3}}\\e^{j2\pi\frac{4}{3}}\end{bmatrix}$ | $\begin{bmatrix}1\\e^{j2\pi\frac{5}{6}}\\e^{j2\pi\frac{5}{3}}\end{bmatrix}$ | | | | | | |
| 4 | $\begin{bmatrix}1\\1\\1\end{bmatrix}$ | $\begin{bmatrix}1\\e^{j2\pi\frac{1}{12}}\\e^{j2\pi\frac{1}{6}}\end{bmatrix}$ | $\begin{bmatrix}1\\e^{j2\pi\frac{1}{6}}\\e^{j2\pi\frac{1}{3}}\end{bmatrix}$ | $\begin{bmatrix}1\\e^{j2\pi\frac{1}{4}}\\e^{j2\pi\frac{1}{2}}\end{bmatrix}$ | $\begin{bmatrix}1\\e^{j2\pi\frac{1}{3}}\\e^{j2\pi\frac{2}{3}}\end{bmatrix}$ | $\begin{bmatrix}1\\e^{j2\pi\frac{5}{12}}\\e^{j2\pi\frac{5}{6}}\end{bmatrix}$ | $\begin{bmatrix}1\\e^{j\pi}\\e^{j2\pi}\end{bmatrix}$ | $\begin{bmatrix}1\\e^{j2\pi\frac{7}{12}}\\e^{j2\pi\frac{7}{6}}\end{bmatrix}$ | $\begin{bmatrix}1\\e^{j2\pi\frac{2}{3}}\\e^{j2\pi\frac{4}{3}}\end{bmatrix}$ | $\begin{bmatrix}1\\e^{j2\pi\frac{3}{4}}\\e^{j2\pi\frac{3}{2}}\end{bmatrix}$ | $\begin{bmatrix}1\\e^{j2\pi\frac{5}{6}}\\e^{j2\pi\frac{10}{3}}\end{bmatrix}$ | $\begin{bmatrix}1\\e^{j2\pi\frac{11}{12}}\\e^{j2\pi\frac{11}{6}}\end{bmatrix}$ |

In one example, a rank 2 precoder is given by $$\frac{1}{s_2}p_{2,i},$$

where $p_{2,i}=[p_{1,k_1(i)} \; p_{1,k_2(i)}]$ and $s_2$ is a scaling factor. Three examples of two-layer (rank 2) FC precoders for $O_1=1, 2, 4$ are shown in Table 15. The codebook includes all of or a subset of the precoders shown in the table.

TABLE 15

Example of two-layer FC precoders

| $0_1$ | $P_{2,0}$ | $P_{2,1}$ | $P_{2,2}$ | $P_{2,3}$ | $P_{2,4}$ | $P_{2,5}$ |
|---|---|---|---|---|---|---|
| 1 | $[p_{1,0}\,p_{1,1}]$ | $[p_{1,0}\,p_{1,2}]$ | $[p_{1,1}\,p_{1,2}]$ | | | |
| 2 | $[p_{1,0}\,p_{1,2}]$ | $[p_{1,0}\,p_{1,4}]$ | $[p_{1,2}\,p_{1,4}]$ | $[p_{1,1}\,p_{1,3}]$ | $[p_{1,1}\,p_{1,5}]$ | $[p_{1,3}\,p_{1,5}]$ |
| 4 | $[p_{1,0}\,p_{1,4}]$ | $[p_{1,0}\,p_{1,8}]$ | $[p_{1,4}\,p_{1,8}]$ | $[p_{1,1}\,p_{1,5}]$ | $[p_{1,1}\,p_{1,9}]$ | $[p_{1,5}\,p_{1,9}]$ |
| | $P_{2,6}$ | $P_{2,7}$ | $P_{2,8}$ | $P_{2,9}$ | $P_{2,10}$ | $P_{2,11}$ |
| | $[p_{1,2}\,p_{1,6}]$ | $[p_{1,2}\,p_{1,10}]$ | $[p_{1,6}\,p_{1,10}]$ | $[p_{1,3}\,p_{1,7}]$ | $[p_{1,3}\,p_{1,11}]$ | $[p_{1,7}\,p_{1,11}]$ |

In one example, a rank 3 precoder is given by $$\frac{1}{s_3}p_{3,i},$$

where $p_{3,i}=[p_{1,m_1(i)} \; p_{1,k_2(i)} \; p_{1,m_3(i)}]$ and $s_3$ is a scaling factor. Three examples of three-layer (rank 3) FC precoders for $O_1=1, 2, 4$ are shown in Table 16. The codebook includes all of or a subset of the precoders shown in the table.

TABLE 16

Example of three-layer FC precoders

| $O_1$ | $P_{3,0}$ | $P_{3,1}$ | $P_{3,2}$ | $P_{3,3}$ |
|---|---|---|---|---|
| 1 | $[p_{1,0}\,p_{1,1}\,p_{1,2}]$ | | | |
| 2 | $[p_{1,0}\,p_{1,2}\,p_{1,4}]$ | $[p_{1,1}\,p_{1,3}\,p_{1,5}]$ | | |
| 4 | $[p_{1,0}\,p_{1,4}\,p_{1,8}]$ | $[p_{1,1}\,p_{1,5}\,p_{1,9}]$ | $[p_{1,2}\,p_{1,6}\,p_{1,10}]$ | $[p_{1,3}\,p_{1,7}\,p_{1,11}]$ |

In one example, $$s_1 = s_2 = s_3 = \frac{1}{s},$$

where s=3 or 2 or $\sqrt{K_{NZ}}$ where $K_{NZ}$ is a number of non-zero entries in the precoder.

In one example, $$s_1 = \frac{1}{\sqrt{3}}.$$

In one example, $$s_2 = \frac{1}{\sqrt{6}}.$$

In one example, $$s_3 = \frac{1}{3}.$$

In one example, the UL codebook includes FC precoders that are based on a combination of the 2Tx precoders ($\overline{W}_{r,i}$) for 2 ports and a co-phase for the 3rd port $\phi_n$. In one example, $\phi_n \in \{1, -1\}$ (BPSK) or $\phi_n \in \{1, -1, j, -j\}$ (QPSK). In one example, $\phi_n \in$ $$\left\{1, -1, j, -j, \frac{1+j}{\sqrt{2}}, \frac{1-j}{\sqrt{2}}, \frac{-1+j}{\sqrt{2}}, \frac{-1-j}{\sqrt{2}}\right\}. \qquad (8\text{-PSK})$$

In one example, a rank 1 precoder is given by $$\frac{1}{s_1}\begin{bmatrix}\overline{W}_{1,i}\\\phi_n\end{bmatrix},$$

where $s_1$ is a scaling factor. An example of single-layer FC precoders ($p_{1,i}$) is shown in Table 17. When $\phi_n \in \{1, -1\}$, the codebook comprises indices 0-7. The codebook includes all of or a subset of the precoders shown in the table.

In one example,

TABLE 17

Example of single-layer FC precoders

| TPMI index i | Intermediate precoder matrix W' |
|---|---|
| 0-3 | $\begin{bmatrix} \overline{W}_{1,0} \\ 1 \end{bmatrix} = \begin{bmatrix} 1 \\ 1 \\ 1 \end{bmatrix}$ $\begin{bmatrix} \overline{W}_{1,1} \\ 1 \end{bmatrix} = \begin{bmatrix} 1 \\ -1 \\ 1 \end{bmatrix}$ $\begin{bmatrix} \overline{W}_{1,2} \\ 1 \end{bmatrix} = \begin{bmatrix} 1 \\ j \\ 1 \end{bmatrix}$ $\begin{bmatrix} \overline{W}_{1,3} \\ 1 \end{bmatrix} = \begin{bmatrix} 1 \\ -j \\ 1 \end{bmatrix}$ |
| 4-7 | $\begin{bmatrix} \overline{W}_{1,0} \\ -1 \end{bmatrix} = \begin{bmatrix} 1 \\ 1 \\ -1 \end{bmatrix}$ $\begin{bmatrix} \overline{W}_{1,1} \\ -1 \end{bmatrix} = \begin{bmatrix} 1 \\ -1 \\ -1 \end{bmatrix}$ $\begin{bmatrix} \overline{W}_{1,2} \\ -1 \end{bmatrix} = \begin{bmatrix} 1 \\ j \\ -1 \end{bmatrix}$ $\begin{bmatrix} \overline{W}_{1,3} \\ -1 \end{bmatrix} = \begin{bmatrix} 1 \\ -j \\ -1 \end{bmatrix}$ |
| 8-11 | $\begin{bmatrix} \overline{W}_{1,0} \\ j \end{bmatrix} = \begin{bmatrix} 1 \\ 1 \\ j \end{bmatrix}$ $\begin{bmatrix} \overline{W}_{1,1} \\ j \end{bmatrix} = \begin{bmatrix} 1 \\ -1 \\ j \end{bmatrix}$ $\begin{bmatrix} \overline{W}_{1,2} \\ j \end{bmatrix} = \begin{bmatrix} 1 \\ j \\ j \end{bmatrix}$ $\begin{bmatrix} \overline{W}_{1,3} \\ j \end{bmatrix} = \begin{bmatrix} 1 \\ -j \\ j \end{bmatrix}$ |
| 12-15 | $\begin{bmatrix} \overline{W}_{1,0} \\ -j \end{bmatrix} = \begin{bmatrix} 1 \\ 1 \\ -j \end{bmatrix}$ $\begin{bmatrix} \overline{W}_{1,1} \\ -j \end{bmatrix} = \begin{bmatrix} 1 \\ -1 \\ -j \end{bmatrix}$ $\begin{bmatrix} \overline{W}_{1,2} \\ -j \end{bmatrix} = \begin{bmatrix} 1 \\ j \\ -j \end{bmatrix}$ $\begin{bmatrix} \overline{W}_{1,3} \\ -j \end{bmatrix} = \begin{bmatrix} 1 \\ -j \\ -j \end{bmatrix}$ |

In one example, a rank 2 precoder is given by $$\frac{1}{s_2}\begin{bmatrix} \overline{W}_{1,k_1(i)} & \overline{W}_{1,k_2(i)} \\ \phi_n & 0 \end{bmatrix} \text{ or } \frac{1}{s_2}\begin{bmatrix} \overline{W}_{1,k_1(i)} & \overline{W}_{1,k_2(i)} \\ 0 & \phi_n \end{bmatrix},$$

where $s_2$ is a scaling factor. A few examples of two-layer FC precoders are shown in Table 18. When $\phi_n \in \{1, -1\}$, the codebook comprises indices 0-3 (or/and 8-11). The codebook includes all of or a subset of the precoders shown in the table.

TABLE 18

Example of two-layer FC precoders

| TPMI index i | Intermediate precoder matrix W' |
|---|---|
| 0-3 | $\begin{bmatrix} 1 & 1 \\ 1 & -1 \\ 1 & 0 \end{bmatrix}$ $\begin{bmatrix} 1 & 1 \\ j & -j \\ 1 & 0 \end{bmatrix}$ $\begin{bmatrix} 1 & 1 \\ 1 & -1 \\ -1 & 0 \end{bmatrix}$ $\begin{bmatrix} 1 & 1 \\ j & -j \\ -1 & 0 \end{bmatrix}$ |
| 4-7 | $\begin{bmatrix} 1 & 1 \\ 1 & -1 \\ j & 0 \end{bmatrix}$ $\begin{bmatrix} 1 & 1 \\ j & -j \\ j & 0 \end{bmatrix}$ $\begin{bmatrix} 1 & 1 \\ 1 & -1 \\ -j & 0 \end{bmatrix}$ $\begin{bmatrix} 1 & 1 \\ j & -j \\ -j & 0 \end{bmatrix}$ |
| 8-11 | $\begin{bmatrix} 1 & 1 \\ 1 & -1 \\ 0 & 1 \end{bmatrix}$ $\begin{bmatrix} 1 & 1 \\ j & -j \\ 0 & 1 \end{bmatrix}$ $\begin{bmatrix} 1 & 1 \\ 1 & -1 \\ 0 & -1 \end{bmatrix}$ $\begin{bmatrix} 1 & 1 \\ j & -j \\ 0 & -1 \end{bmatrix}$ |
| 12-15 | $\begin{bmatrix} 1 & 1 \\ 1 & -1 \\ 0 & j \end{bmatrix}$ $\begin{bmatrix} 1 & 1 \\ j & -j \\ 0 & j \end{bmatrix}$ $\begin{bmatrix} 1 & 1 \\ 1 & -1 \\ 0 & -j \end{bmatrix}$ $\begin{bmatrix} 1 & 1 \\ j & -j \\ 0 & -j \end{bmatrix}$ |

In one example, a rank 3 precoder is given by $$\frac{1}{s_3}\begin{bmatrix} \overline{W}_{1,k_1(i)} & \overline{W}_{1,k_2(i)} & 0 \\ 0 & 0 & 1 \end{bmatrix},$$

where $s_3$ is a scaling factor. A few examples of three-layer FC precoders are shown in Table 19. The codebook includes all of or a subset of the precoders shown in the table.

TABLE 19

Example of three-layer FC precoders

| TPMI index i | Intermediate precoder matrix W' |
|---|---|
| 0-1 | $\begin{bmatrix} 1 & 1 & 0 \\ 1 & -1 & 0 \\ 0 & 0 & 1 \end{bmatrix}$ $\begin{bmatrix} 1 & 1 & 0 \\ j & -j & 0 \\ 0 & 0 & 1 \end{bmatrix}$ |

In one example, the UL codebook includes FC precoders that are based on 4Tx precoders (Rel. 15 UL 4Tx FC precoders, or Rel. 15 DL Type I single panel codebook, 5.2.2.2.1, 38.214). For instance, two out of four rows of the 4Tx precoders can be added and the resultant row can be mapped to one of the three ports (rows) of the 3Tx precoders. Note that this results in a non-constant modulus 3Tx precoders since the power of one port will be more than (e.g. double) that of the remaining two ports.

In one example, a rank 1 precoder is given by $$\frac{1}{s_1}p_{1,i},$$

where $s_1$ is a scaling factor. Two examples of one-layer (rank 1) FC precoders are shown in Table 20 and Table 21. The codebook includes all of or a subset of the precoders shown in the table.

TABLE 20

Example of one-layer FC precoders

| TPMI index i | Intermediate precoder matrix W' | | | | | | | |
|---|---|---|---|---|---|---|---|---|
| | $p_{1,0}$ | $p_{1,1}$ | $p_{1,2}$ | $p_{1,3}$ | $p_{1,4}$ | $p_{1,5}$ | $p_{1,6}$ | $p_{1,7}$ |

TABLE 20-continued

Example of one-layer FC precoders

| 0-7 | $\begin{bmatrix} 1 \\ 1 \\ \sqrt{2} \end{bmatrix}$ | $\begin{bmatrix} 1 \\ 1 \\ \sqrt{2}\,j \end{bmatrix}$ | $\begin{bmatrix} 1 \\ 1 \\ -\sqrt{2} \end{bmatrix}$ | $\begin{bmatrix} 1 \\ 1 \\ -\sqrt{2}\,j \end{bmatrix}$ | $\begin{bmatrix} 1 \\ -1 \\ \sqrt{2} \end{bmatrix}$ | $\begin{bmatrix} 1 \\ -1 \\ \sqrt{2}\,j \end{bmatrix}$ | $\begin{bmatrix} 1 \\ -1 \\ -\sqrt{2} \end{bmatrix}$ | $\begin{bmatrix} 1 \\ -1 \\ -\sqrt{2}\,j \end{bmatrix}$ |

| TPMI index i | $P_{1,8}$ | $P_{1,9}$ | $P_{1,10}$ | $P_{1,11}$ | $P_{1,12}$ | $P_{1,13}$ | $P_{1,14}$ | $P_{1,15}$ |
|---|---|---|---|---|---|---|---|---|
| 8-15 | $\begin{bmatrix} 1 \\ j \\ \sqrt{2} \end{bmatrix}$ | $\begin{bmatrix} 1 \\ j \\ \sqrt{2}\,j \end{bmatrix}$ | $\begin{bmatrix} 1 \\ j \\ -\sqrt{2} \end{bmatrix}$ | $\begin{bmatrix} 1 \\ j \\ -\sqrt{2}\,j \end{bmatrix}$ | $\begin{bmatrix} 1 \\ -j \\ \sqrt{2} \end{bmatrix}$ | $\begin{bmatrix} 1 \\ -j \\ \sqrt{2}\,j \end{bmatrix}$ | $\begin{bmatrix} 1 \\ -j \\ -\sqrt{2} \end{bmatrix}$ | $\begin{bmatrix} 1 \\ -j \\ -\sqrt{2}\,j \end{bmatrix}$ |

TABLE 21

Example of one-layer FC precoders

| TPMI index i | Intermediate precoder matrix W' | | | | | | | |
|---|---|---|---|---|---|---|---|---|
| | $P_{1,0}$ | $P_{1,1}$ | $P_{1,2}$ | $P_{1,3}$ | $P_{1,4}$ | $P_{1,5}$ | $P_{1,6}$ | $P_{1,7}$ |
| 0-7 | $\begin{bmatrix} \frac{1}{\sqrt{2}} \\ \frac{1}{\sqrt{2}} \\ 1 \end{bmatrix}$ | $\begin{bmatrix} \frac{1}{\sqrt{2}} \\ \frac{1}{\sqrt{2}} \\ j \end{bmatrix}$ | $\begin{bmatrix} \frac{1}{\sqrt{2}} \\ \frac{1}{\sqrt{2}} \\ -1 \end{bmatrix}$ | $\begin{bmatrix} \frac{1}{\sqrt{2}} \\ \frac{1}{\sqrt{2}} \\ -j \end{bmatrix}$ | $\begin{bmatrix} \frac{1}{\sqrt{2}} \\ -\frac{1}{\sqrt{2}} \\ 1 \end{bmatrix}$ | $\begin{bmatrix} \frac{1}{\sqrt{2}} \\ -\frac{1}{\sqrt{2}} \\ j \end{bmatrix}$ | $\begin{bmatrix} \frac{1}{\sqrt{2}} \\ -\frac{1}{\sqrt{2}} \\ -1 \end{bmatrix}$ | $\begin{bmatrix} \frac{1}{\sqrt{2}} \\ -\frac{1}{\sqrt{2}} \\ -j \end{bmatrix}$ |

| TPMI index i | $P_{1,8}$ | $P_{1,9}$ | $P_{1,10}$ | $P_{1,11}$ | $P_{1,12}$ | $P_{1,13}$ | $P_{1,14}$ | $P_{1,15}$ |
|---|---|---|---|---|---|---|---|---|
| 8-15 | $\begin{bmatrix} \frac{1}{\sqrt{2}} \\ \frac{1}{\sqrt{2}}j \\ 1 \end{bmatrix}$ | $\begin{bmatrix} \frac{1}{\sqrt{2}} \\ \frac{1}{\sqrt{2}}j \\ j \end{bmatrix}$ | $\begin{bmatrix} \frac{1}{\sqrt{2}} \\ \frac{1}{\sqrt{2}}j \\ -1 \end{bmatrix}$ | $\begin{bmatrix} \frac{1}{\sqrt{2}} \\ \frac{1}{\sqrt{2}}j \\ -j \end{bmatrix}$ | $\begin{bmatrix} \frac{1}{\sqrt{2}} \\ -\frac{1}{\sqrt{2}}j \\ 1 \end{bmatrix}$ | $\begin{bmatrix} \frac{1}{\sqrt{2}} \\ -\frac{1}{\sqrt{2}}j \\ j \end{bmatrix}$ | $\begin{bmatrix} \frac{1}{\sqrt{2}} \\ -\frac{1}{\sqrt{2}}j \\ -1 \end{bmatrix}$ | $\begin{bmatrix} \frac{1}{\sqrt{2}} \\ -\frac{1}{\sqrt{2}}j \\ -j \end{bmatrix}$ |

In one example, a rank 2 precoder is given by $$\frac{1}{s_2} p_{2,i},$$

where $s_2$ is a scaling factor. Two examples of two-layer (rank 2) FC precoders are shown in Table 22 and Table 23. The codebook includes all of or a subset of the precoders shown in the table.

TABLE 22

Example of two-layer FC precoders

| TPMI index i | Intermediate precoder matrix W' | | | |
|---|---|---|---|---|
| | $P_{2,0}$ | $P_{2,1}$ | $P_{2,2}$ | $P_{2,3}$ |
| 0-3 | $\begin{bmatrix} 1 & 1 \\ 1 & 1 \\ \sqrt{2} & -\sqrt{2} \end{bmatrix}$ | $\begin{bmatrix} 1 & 1 \\ 1 & 1 \\ \sqrt{2}\,j & -\sqrt{2}\,j \end{bmatrix}$ | $\begin{bmatrix} 1 & 1 \\ -1 & -1 \\ \sqrt{2} & -\sqrt{2} \end{bmatrix}$ | $\begin{bmatrix} 1 & 1 \\ -1 & -1 \\ \sqrt{2}\,j & -\sqrt{2}\,j \end{bmatrix}$ |

| TPMI index i | $P_{2,4}$ | $P_{2,5}$ | $P_{2,6}$ | $P_{2,7}$ |
|---|---|---|---|---|
| 4-7 | $\begin{bmatrix} 1 & 1 \\ j & j \\ \sqrt{2} & -\sqrt{2} \end{bmatrix}$ | $\begin{bmatrix} 1 & 1 \\ j & j \\ \sqrt{2}\,j & -\sqrt{2}\,j \end{bmatrix}$ | $\begin{bmatrix} 1 & 1 \\ -j & -j \\ \sqrt{2} & -\sqrt{2} \end{bmatrix}$ | $\begin{bmatrix} 1 & 1 \\ -j & -j \\ \sqrt{2}\,j & -\sqrt{2}\,j \end{bmatrix}$ |

TABLE 22-continued

Example of two-layer FC precoders

TABLE 23

Example of two-layer FC precoders

| TPMI index i | Intermediate precoder matrix W' | | | |
|---|---|---|---|---|
| | $P_{2,0}$ | $P_{2,1}$ | $P_{2,2}$ | $P_{2,3}$ |
| 0-3 | $\begin{bmatrix} \frac{1}{\sqrt{2}} & \frac{1}{\sqrt{2}} \\ \frac{1}{\sqrt{2}} & \frac{1}{\sqrt{2}} \\ 1 & -1 \end{bmatrix}$ | $\begin{bmatrix} \frac{1}{\sqrt{2}} & \frac{1}{\sqrt{2}} \\ \frac{1}{\sqrt{2}} & \frac{1}{\sqrt{2}} \\ j & -j \end{bmatrix}$ | $\begin{bmatrix} \frac{1}{\sqrt{2}} & \frac{1}{\sqrt{2}} \\ -\frac{1}{\sqrt{2}} & -\frac{1}{\sqrt{2}} \\ 1 & -1 \end{bmatrix}$ | $\begin{bmatrix} \frac{1}{\sqrt{2}} & \frac{1}{\sqrt{2}} \\ -\frac{1}{\sqrt{2}} & -\frac{1}{\sqrt{2}} \\ j & -j \end{bmatrix}$ |

| TPMI index i | $P_{2,4}$ | $P_{2,5}$ | $P_{2,6}$ | $P_{2,7}$ |
|---|---|---|---|---|
| 4-7 | $\begin{bmatrix} \frac{1}{\sqrt{2}} & \frac{1}{\sqrt{2}} \\ \frac{1}{\sqrt{2}}j & \frac{1}{\sqrt{2}}j \\ 1 & -1 \end{bmatrix}$ | $\begin{bmatrix} \frac{1}{\sqrt{2}} & \frac{1}{\sqrt{2}} \\ \frac{1}{\sqrt{2}}j & \frac{1}{\sqrt{2}}j \\ j & -j \end{bmatrix}$ | $\begin{bmatrix} \frac{1}{\sqrt{2}} & \frac{1}{\sqrt{2}} \\ -\frac{1}{\sqrt{2}}j & -\frac{1}{\sqrt{2}}j \\ 1 & -1 \end{bmatrix}$ | $\begin{bmatrix} \frac{1}{\sqrt{2}} & \frac{1}{\sqrt{2}} \\ -\frac{1}{\sqrt{2}}j & -\frac{1}{\sqrt{2}}j \\ j & -j \end{bmatrix}$ |

In one example, a rank 3 precoder is given by $$\frac{1}{s_3} p_{3,i},$$

where $s_3$ is a scaling factor. Two examples of three-layer (rank 3) FC precoders are shown in Table 24 and Table 25. The codebook includes all of or a subset of the precoders shown in the table.

TABLE 24

Example of three-layer FC precoders

| TPMI index i | Intermediate precoder matrix W' | | | |
|---|---|---|---|---|
| | $P_{3,0}$ | $P_{3,1}$ | $P_{3,2}$ | $P_{3,3}$ |
| 0-3 | $\begin{bmatrix} 1 & 1 & 1 \\ 1 & 1 & -1 \\ \sqrt{2} & -\sqrt{2} & 0 \end{bmatrix}$ | $\begin{bmatrix} 1 & 1 & 1 \\ 1 & 1 & -1 \\ \sqrt{2}\,j & -\sqrt{2}\,j & 0 \end{bmatrix}$ | $\begin{bmatrix} 1 & 1 & 1 \\ -1 & -1 & 1 \\ \sqrt{2} & -\sqrt{2} & 0 \end{bmatrix}$ | $\begin{bmatrix} 1 & 1 & 1 \\ -1 & -1 & 1 \\ \sqrt{2}\,j & -\sqrt{2}\,j & 0 \end{bmatrix}$ |

| TPMI index i | $P_{3,4}$ | $P_{3,5}$ | $P_{3,6}$ | $P_{3,7}$ |
|---|---|---|---|---|
| 4-7 | $\begin{bmatrix} 1 & 1 & 1 \\ j & j & -j \\ \sqrt{2} & -\sqrt{2} & 0 \end{bmatrix}$ | $\begin{bmatrix} 1 & 1 & 1 \\ j & j & -j \\ \sqrt{2}\,j & -\sqrt{2}\,j & 0 \end{bmatrix}$ | $\begin{bmatrix} 1 & 1 & 1 \\ -j & -j & j \\ \sqrt{2} & -\sqrt{2} & 0 \end{bmatrix}$ | $\begin{bmatrix} 1 & 1 & 1 \\ -j & -j & j \\ \sqrt{2}\,j & -\sqrt{2}\,j & 0 \end{bmatrix}$ |

TABLE 25

Example of three-layer FC precoders

| TPMI index i | Intermediate precoder matrix W' | | | |
|---|---|---|---|---|
| | $P_{3,0}$ | $P_{3,1}$ | $P_{3,2}$ | $P_{3,3}$ |
| 0-3 | $\begin{bmatrix} \frac{1}{\sqrt{2}} & \frac{1}{\sqrt{2}} & \frac{1}{\sqrt{2}} \\ \frac{1}{\sqrt{2}} & \frac{1}{\sqrt{2}} & -\frac{1}{\sqrt{2}} \\ 1 & -1 & 0 \end{bmatrix}$ | $\begin{bmatrix} \frac{1}{\sqrt{2}} & \frac{1}{\sqrt{2}} & \frac{1}{\sqrt{2}} \\ \frac{1}{\sqrt{2}} & \frac{1}{\sqrt{2}} & -\frac{1}{\sqrt{2}} \\ j & -j & 0 \end{bmatrix}$ | $\begin{bmatrix} \frac{1}{\sqrt{2}} & \frac{1}{\sqrt{2}} & \frac{1}{\sqrt{2}} \\ -\frac{1}{\sqrt{2}} & -\frac{1}{\sqrt{2}} & \frac{1}{\sqrt{2}} \\ 1 & -1 & 0 \end{bmatrix}$ | $\begin{bmatrix} \frac{1}{\sqrt{2}} & \frac{1}{\sqrt{2}} & \frac{1}{\sqrt{2}} \\ -\frac{1}{\sqrt{2}} & -\frac{1}{\sqrt{2}} & \frac{1}{\sqrt{2}} \\ j & -j & 0 \end{bmatrix}$ |

TABLE 25-continued

Example of three-layer FC precoders

| TPMI index i | $P_{3,4}$ | $P_{3,5}$ | $P_{3,6}$ | $P_{3,7}$ |
|---|---|---|---|---|
| 4-7 | $\begin{bmatrix} \frac{1}{\sqrt{2}} & \frac{1}{\sqrt{2}} & \frac{1}{\sqrt{2}} \\ \frac{1}{\sqrt{2}}j & \frac{1}{\sqrt{2}}j & -\frac{1}{\sqrt{2}}j \\ 1 & -1 & 0 \end{bmatrix}$ | $\begin{bmatrix} \frac{1}{\sqrt{2}} & \frac{1}{\sqrt{2}} & \frac{1}{\sqrt{2}} \\ \frac{1}{\sqrt{2}}j & \frac{1}{\sqrt{2}}j & -\frac{1}{\sqrt{2}}j \\ j & -j & 0 \end{bmatrix}$ | $\begin{bmatrix} \frac{1}{\sqrt{2}} & \frac{1}{\sqrt{2}} & \frac{1}{\sqrt{2}} \\ -\frac{1}{\sqrt{2}}j & -\frac{1}{\sqrt{2}}j & \frac{1}{\sqrt{2}}j \\ 1 & -1 & 0 \end{bmatrix}$ | $\begin{bmatrix} \frac{1}{\sqrt{2}} & \frac{1}{\sqrt{2}} & \frac{1}{\sqrt{2}} \\ -\frac{1}{\sqrt{2}}j & -\frac{1}{\sqrt{2}}j & \frac{1}{\sqrt{2}}j \\ j & -j & 0 \end{bmatrix}$ |

In one embodiment, the codebook for 3 antenna ports, as described in previous embodiment (or later embodiments), can also be used/configured (to a UE) for DL (e.g. for CSI/PMI reporting based on 3 CSI-RS antenna ports at NW/gNB), or sidelink (SL) (e.g. for CSI/PMI reporting based on 3 CSI-RS antenna ports at a SL UE/device). It can also be used to configure/trigger a CSI report for network energy saving (NES) applications wherein the NW/gNB may want to trigger (e.g. dynamically via MAC CE or DCI) a sub-configurations of the CSI report in which the number of CSI-RS ports is less than that at the NW/gNB. For instance, NW/gNB may trigger a CSI report for 3 CSI-RS ports that are a subset of >3 (e.g. 4, or 8) CSI-RS ports.

Various embodiments provide for a 3Tx partial coherent codebook design for Ng=2. In one embodiment, the UL codebook includes partial-coherent (PC) precoding matrices, and a PC precoding matrix can be defined as a matrix whose each column comprises both zero and non-zero entries, e.g., at least two non-zero and remaining zero elements/entries in each column. In one example, an UL codebook with PC precoders can be configured to a UE when the UE has a cross-/dual-polarized and a uni-/co-polarized antenna combination or the UE reports UE capability information indicating the support for Ng=2.

If numbering A is used to construct 3Tx precoders based on 2Tx precoders, then the 2Tx precoders are applied to consecutive 2 out of 3 ports, i.e., (1, 2 or 3) or (0, 1 or 2). Or, if numbering B is used to construct 3Tx precoders based on 2Tx precoders, then the 2Tx precoders are applied to one of the following port pairs, {(1,3), (2)} or {(0,2), (1)}.

In one example, the precoding matrix $W=W_B$ for numbering scheme B can be obtained by row permutation (ordering) of the precoding matrix $W=W_A$ for numbering scheme A. For example, $$W_B = W_{f(i)} = W'_i = W_A$$

where the subscripts i and $k_i=f(i)$ denote the row of the respective matrix; f(i) is given by Table 26;

TABLE 26

The port mapping function f(i) for transmission using 8 antenna ports

| i | f(i): $N_g = 2$ | f(i): $N_g = 2$ | f(i): $N_g = 2$ |
|---|---|---|---|
| 0 | 0 | 0 | 1 |
| 1 | 1 | 2 | 2 |
| 2 | 2 | 1 | 0 |

The row index $j \in \{0, 1, \ldots, 2\}$ maps to ports $f(j) \in \{g_{1,1}, g_{1,2}, g_{2,1}\}$, respectively, $\{g_{a,b}\}$ are defined later. In one example, $W_{f(j)}=W'_j$ is referred to as intermediate precoder or precoding matrix.

In one embodiment II.1, the 3Tx PC precoders for $N_g=2$ are based on Rel. 15 2Tx UL FC precoders (rank-1 2Tx TPMI=2, 3, 4, 5 and rank-2 2Tx TPMI=1, 2), wherein one 2Tx TPMI is indicated/configured, depending on $l_i$ values, where i=1, 2 and $l_i \in \{0, 1, 2\}$ for the group with 2 ports.

Let $e_i$ denote an 3×1 column vector whose i-th entry is 1, and remaining entries are all 0. Then, $$e_1 = \frac{1}{s}\begin{bmatrix} 1 \\ 0 \\ 0 \end{bmatrix}, e_2 = \frac{1}{s}\begin{bmatrix} 0 \\ 1 \\ 0 \end{bmatrix}, e_3 = \frac{1}{s}\begin{bmatrix} 0 \\ 0 \\ 1 \end{bmatrix}.$$

In one example, s=√3.

Let $$P = \begin{bmatrix} p_1 \\ p_2 \end{bmatrix}$$

is a rank 1 precoding matrix for 2 antenna ports, and $M_{3\times1}$ ($m_{i_j}=p_j$) an 3×1 column vector whose $i_j$ entry is $m_{i_j}=p_j$. Then, $$[e_{i_1} e_{i_2}]P = [e_{i_1} e_{i_2}]\begin{bmatrix} p_1 \\ p_2 \end{bmatrix} = [p_1 e_{i_1} + p_2 e_{i_2}] = M_{3\times1}((m_{i_1}, m_{i_2}) = (p_1, p_2))$$

TABLE 27

FC precoders for 2 antenna ports

| j = 0-3 | 4 rank1 TPMIs 2, 3, 4, 5 | $P_{1,1} = \begin{bmatrix} 1 \\ 1 \end{bmatrix}$ | $P_{1,2} = \begin{bmatrix} 1 \\ -1 \end{bmatrix}$ | $P_{1,3} = \begin{bmatrix} 1 \\ j \end{bmatrix}$ | $P_{1,4} = \begin{bmatrix} 1 \\ -j \end{bmatrix}$ |
|---|---|---|---|---|---|
| j = 0-1 | 2 rank2 TPMIs 1, 2 | $P_{2,1} = \begin{bmatrix} 1 & 1 \\ 1 & -1 \end{bmatrix}$ | $P_{2,2} = \begin{bmatrix} 1 & 1 \\ j & -j \end{bmatrix}$ | | |

In one example, $f(j)=i_j$. In one example, f(i)=j.

In one embodiment, the UL codebook for 3 antenna ports include partial-coherent (PC) precoders or precoding matrices that correspond to $N_g=2$, wherein the 3 antenna ports PC precoders or precoding matrices are based on Rel. 15 2Tx UL FC precoders (rank-1 2Tx TPMI=2, 3, 4, 5 and rank-2 2Tx TPMI=1, 2), as shown in Table 27. Note that the scaling $$\frac{1}{\sqrt{2}} \text{ and } \frac{1}{2}$$

for rank 1 and 2, respectively, is not shown in table for brevity. The notation $P_{1,i}$ (i=0, 1, 2, 3) and $P_{2,i}$ (i=0, 1) respectively denote the 2Tx submatrices used to represent or construct the 3Tx precoder for Ng=2. In one example, the notation $$W_{1,i} = \frac{1}{\sqrt{2}} P_{1,i} \text{ and } W_{2,i} = \frac{1}{2} P_{2,i}$$

can be used to represent the 2 precoders with scaling.

In one example, when the 3 port indices are {1,2,3}, the two groups $\{G_1, G_2\}=\{(g_{1,1}, g_{1,2}), g_2\}=\{(1,2),3\}$ or $\{(1,3), 2\}$ or $\{(2,3),1\}$.

In one example, when the 3 port indices are {0, 1, 2}, the two groups $\{G_1, G_2\}=\{(g_{1,1}, g_{1,2}), g_2\}=\{(0,1), 2\}$, or $\{(0,2), 1\}$ or $\{(1,2), 0\}$.

For the group that is not applied any layers, a $0_{y\times r}$ all zero matrix is included in the corresponding rank r 3Tx precoders. In one example, the 3Tx precoders are scaled (multiplied) by 1/s. In one example, $s=\sqrt{3}$. In one example, s=2. In one example, $s=\sqrt{3r}$ where r is a rank value. In one example, $s=\sqrt{K_{NZ}}$ where $K_{NZ}$ is a number of non-zero entries in the precoder.

In one example, the 3Tx precoders included in the codebook correspond to all of or a subset of those in Table 28 or/and Table 29 or/and Table 30, where the port split (P1,P2) refers to number of ports in two groups ($G_1$, $G_2$), and the layer split (L1,L2) refers to number of ports in two groups ($G_1$, $G_2$).

TABLE 28

| Rank | Port split: (P1, P2) | Layer split: (L1, L2) | 3Tx precoders | #precoders |
|---|---|---|---|---|
| 1 | (2, 1) | (1, 0) | $Q_{G_1, j} = [e_{g_{1,1}} \ e_{g_{1,2}}]P_{1,j}$, and j = 1, ..., 4 | 4 |
| | | (0, 1) | $Q_{G_2} = [e_{g_2}]$ | 1 |
| | (1, 2) | (1, 0) | $Q_{G_1} = [e_{g_1}]$ | 1 |
| | | (0, 1) | $Q_{G_2, j} = [e_{g_{2,1}} \ e_{g_{2,2}}]P_{1,j}$, and j = 1, ..., 4 | 4 |
| 2 | (2, 1) | (2, 0) | $R_{G_1, j} = [e_{g_{1,1}} \ e_{g_{1,2}}]P_{2,j}$, and j = 1, 2 | 2 |
| | | (1, 1) | $[Q_{G_1, j}, Q_{G_2}]$, and j = 1, ..., 4 | 4 |
| | (1, 2) | (1, 1) | $[Q_{G_1}, Q_{G_2, j}]$, and j = 1, ..., 4 | 4 |
| | | (0, 2) | $R_{G_2, j} = [e_{g_{2,1}} \ e_{g_{2,2}}]P_{2,j}$, and j = 1, 2 | 2 |
| 3 | (2, 1) | (2, 1) | $[R_{G_1, j}, Q_{G_2}]$, j = 1, 2 | 2 |
| | (1, 2) | (1, 2) | $[Q_{G_1}, R_{G_2, j}]$, j = 1, 2 | 2 |

TABLE 29

| Rank | Port split: (P1, P2) | Layer split: (L1, L2) | 3Tx precoders | #precoders |
|---|---|---|---|---|
| 1 | (2, 1) | (1, 0) | $Q_{G_1, j} = [e_{g_{1,1}} \ e_{g_{1,2}}]P_{1,j}$, and j = 1, ..., 4 | 4 |
| | | (0, 1) | $Q_{G_2} = [e_{g_2}]$ | 1 |
| 2 | (2, 1) | (2, 0) | $R_{G_1, j} = [e_{g_{1,1}} \ e_{g_{1,2}}]P_{2,j}$, and j = 1, 2 | 2 |
| | | (1, 1) | $[Q_{G_1, j}, Q_{G_2}]$, and j = 1, ..., 4 | 4 |
| 3 | (2, 1) | (2, 1) | $[R_{G_1, j}, Q_{G_2}]$, j = 1, 2 | 2 |

TABLE 30

| Rank | Port split: (P1, P2) | Layer split: (L1, L2) | 3Tx precoders | #precoders |
|---|---|---|---|---|
| 1 | (1, 2) | (1, 0) | $Q_{G_1} = [e_{g_1}]$ | 1 |
| | | (0, 1) | $Q_{G_2, j} = [e_{g_{2,1}} \ e_{g_{2,2}}]P_{1,j}$, and j = 1, ..., 4 | 4 |
| 2 | (1, 2) | (1, 1) | $[Q_{G_1}, Q_{G_2, j}]$, and j = 1, ..., 4 | 4 |
| | | (0, 2) | $R_{G_2, j} = [e_{g_{2,1}} \ e_{g_{2,2}}]P_{2,j}$, and j = 1, 2 | 2 |
| 3 | (1, 2) | (1, 2) | $[Q_{G_1}, R_{G_2, j}]$, j = 1, 2 | 2 |

For the three values of the groups to ports mapping $\{G_1, G_2\}=\{(g_{1,1}, g_{1,2}), g_2\}$, as described above, precoders are shown in Table 31, Table 32, and Table 33, respectively. In one example, $s_1=s_2=s_3=s$, where s=3 or 2 or $\sqrt{K_{NZ}}$ where $K_{NZ}$ is a number of non-zero entries in the precoder. In one example, $s_1=\sqrt{3}$. In one example, $s_2=\sqrt{6}$. In one example, $s_3=3$. The codebook includes all of or a subset of the precoders shown in the table.

TABLE 31

| precoding matrix $W_i' = W_A$ | | | |
|---|---|---|---|
| Rank | TPMI index i | Index i | precoder matrix W' |

TABLE 31-continued

| | | precoding matrix $W_i' = W_A$ | | |
|---|---|---|---|---|
| 1 | 0-4 | 0-4 | $\frac{1}{s_1}\begin{bmatrix} \overline{W}_{1,0} \\ 0 \end{bmatrix} = \frac{1}{s_1}\begin{bmatrix} 1 \\ 1 \\ 0 \end{bmatrix}$ | $\frac{1}{s_1}\begin{bmatrix} \overline{W}_{1,1} \\ 0 \end{bmatrix} = \frac{1}{s_1}\begin{bmatrix} 1 \\ -1 \\ 0 \end{bmatrix}$ |
| 2 | 5 -10 | 0-5 | $\frac{1}{s_2}\begin{bmatrix} \overline{W}_{2,0} \\ 0_{1\times2} \end{bmatrix} = \frac{1}{s_2}\begin{bmatrix} 1 & 1 \\ 1 & -1 \\ 0 & 0 \end{bmatrix}$ | $\frac{1}{s_2}\begin{bmatrix} \overline{W}_{2,1} \\ 0_{1\times2} \end{bmatrix} = \frac{1}{s_2}\begin{bmatrix} 1 & 1 \\ j & -j \\ 0 & 0 \end{bmatrix}$ |
| 3 | 11-12 | 0-1 | $\frac{1}{s_3}\begin{bmatrix} \overline{W}_{2,0} & 0_{2\times1} \\ 0_{1\times2} & 1 \end{bmatrix} = \frac{1}{s_3}\begin{bmatrix} 1 & 1 & 0 \\ 1 & -1 & 0 \\ 0 & 0 & 1 \end{bmatrix}$ | $\frac{1}{s_3}\begin{bmatrix} \overline{W}_{2,10} & 0_{2\times1} \\ 0_{1\times2} & 1 \end{bmatrix} = \frac{1}{s_3}\begin{bmatrix} 1 & 1 & 0 \\ j & -j & 0 \\ 0 & 0 & 1 \end{bmatrix}$ |

| | precoder matrix W' | | | |
|---|---|---|---|---|
| 1 | $\frac{1}{s_1}\begin{bmatrix} \overline{W}_{1,2} \\ 0 \end{bmatrix} = \frac{1}{s_1}\begin{bmatrix} 1 \\ j \\ 0 \end{bmatrix}$ | $\frac{1}{s_1}\begin{bmatrix} \overline{W}_{1,3} \\ 0 \end{bmatrix} = \frac{1}{s_1}\begin{bmatrix} 1 \\ -j \\ 0 \end{bmatrix}$ | $\frac{1}{s_1}\begin{bmatrix} 0_{2\times1} \\ 1 \end{bmatrix} = \frac{1}{s_1}\begin{bmatrix} 0 \\ 0 \\ 1 \end{bmatrix}$ | |
| 2 | $\frac{1}{s_2}\begin{bmatrix} \overline{W}_{1,0} & 0_{2\times1} \\ 0 & 1 \end{bmatrix} = \frac{1}{s_2}\begin{bmatrix} 1 & 0 \\ 1 & 0 \\ 0 & 1 \end{bmatrix}$ | $\frac{1}{s_2}\begin{bmatrix} \overline{W}_{1,1} & 0_{2\times1} \\ 0 & 1 \end{bmatrix} = \frac{1}{s_2}\begin{bmatrix} 1 & 0 \\ -1 & 0 \\ 0 & 1 \end{bmatrix}$ | $\frac{1}{s_2}\begin{bmatrix} \overline{W}_{1,2} & 0_{2\times1} \\ 0 & 1 \end{bmatrix} = \frac{1}{s_2}\begin{bmatrix} 1 & 0 \\ j & 0 \\ 0 & 1 \end{bmatrix}$ | $\frac{1}{s_2}\begin{bmatrix} \overline{W}_{1,3} & 0_{2\times1} \\ 0 & 1 \end{bmatrix} = \frac{1}{s_2}\begin{bmatrix} 1 & 0 \\ -j & 0 \\ 0 & 1 \end{bmatrix}$ |
| 3 | | | | |

TABLE 32

| | | precoding matrix $W'_i = W_A$ | | |
|---|---|---|---|---|
| Rank | TPMI index i | Index j | precoder matrix W' | |
| 1 | 0-4 | 0-4 | $\frac{1}{s_1}\begin{bmatrix} 1 \\ 0_{2\times1} \end{bmatrix} = \frac{1}{s_1}\begin{bmatrix} 1 \\ 0 \\ 0 \end{bmatrix}$ | $\frac{1}{s_1}\begin{bmatrix} 0 \\ \overline{W}_{1,0} \end{bmatrix} = \frac{1}{s_1}\begin{bmatrix} 0 \\ 1 \\ 1 \end{bmatrix}$ |
| 2 | 5-10 | 0-5 | $\frac{1}{s_2}\begin{bmatrix} 0_{1\times2} \\ \overline{W}_{2,0} \end{bmatrix} = \frac{1}{s_2}\begin{bmatrix} 0 & 0 \\ 1 & 1 \\ 1 & -1 \end{bmatrix}$ | $\frac{1}{s_2}\begin{bmatrix} 0_{1\times2} \\ \overline{W}_{2,1} \end{bmatrix} = \frac{1}{s_2}\begin{bmatrix} 0 & 0 \\ 1 & 1 \\ j & -j \end{bmatrix}$ |
| 3 | 11-12 | 0-1 | $\frac{1}{s_3}\begin{bmatrix} 0_{1\times2} & 1 \\ \overline{W}_{2,0} & 0_{2\times1} \end{bmatrix} = \frac{1}{s_3}\begin{bmatrix} 0 & 0 & 1 \\ 1 & 1 & 0 \\ 1 & -1 & 0 \end{bmatrix}$ | $\frac{1}{s_3}\begin{bmatrix} 0_{1\times2} & 1 \\ \overline{W}_{2,0} & 0_{2\times1} \end{bmatrix} = \frac{1}{s_3}\begin{bmatrix} 0 & 0 & 1 \\ 1 & 1 & 0 \\ j & -j & 0 \end{bmatrix}$ |

| | precoder matrix W' | | | |
|---|---|---|---|---|
| 1 | $\frac{1}{s_1}\begin{bmatrix} 0 \\ \overline{W}_{1,1} \end{bmatrix} = \frac{1}{s_1}\begin{bmatrix} 0 \\ 1 \\ -1 \end{bmatrix}$ | $\frac{1}{s_1}\begin{bmatrix} 0 \\ \overline{W}_{1,20} \end{bmatrix} = \frac{1}{s_1}\begin{bmatrix} 0 \\ 1 \\ j \end{bmatrix}$ | $\frac{1}{s_1}\begin{bmatrix} 0 \\ \overline{W}_{1,3} \end{bmatrix} = \frac{1}{s_1}\begin{bmatrix} 0 \\ 1 \\ -j \end{bmatrix}$ | |
| 2 | $\frac{1}{s_2}\begin{bmatrix} 0 & 1 \\ \overline{W}_{1,0} & 0_{2\times1} \end{bmatrix} = \frac{1}{s_2}\begin{bmatrix} 0 & 1 \\ 1 & 0 \\ 1 & 0 \end{bmatrix}$ | $\frac{1}{s_2}\begin{bmatrix} 0 & 1 \\ \overline{W}_{1,1} & 0_{2\times1} \end{bmatrix} = \frac{1}{s_2}\begin{bmatrix} 0 & 1 \\ 1 & 0 \\ -1 & 0 \end{bmatrix}$ | $\frac{1}{s_2}\begin{bmatrix} 0 & 1 \\ \overline{W}_{1,2} & 0_{2\times1} \end{bmatrix} = \frac{1}{s_2}\begin{bmatrix} 0 & 1 \\ 1 & 0 \\ j & 0 \end{bmatrix}$ | $\frac{1}{s_2}\begin{bmatrix} 0 & 1 \\ \overline{W}_{1,3} & 0_{2\times1} \end{bmatrix} = \frac{1}{s_2}\begin{bmatrix} 0 & 1 \\ 1 & 0 \\ -j & 0 \end{bmatrix}$ |
| 3 | | | | |

TABLE 33

| | | | precoding matrix $W'_i = W_A$ | | | | |
|---|---|---|---|---|---|---|---|
| Rank | TPMI index i | Index j | precoder matrix W' | | | | |
| 1 | 0-4 | 0-4 | $\frac{1}{s_1}\begin{bmatrix} 0 \\ 1 \\ 0 \end{bmatrix}$ | $\frac{1}{s_1}\begin{bmatrix} 1 \\ 0 \\ 1 \end{bmatrix}$ | $\frac{1}{s_1}\begin{bmatrix} 1 \\ 0 \\ -1 \end{bmatrix}$ | $\frac{1}{s_1}\begin{bmatrix} 1 \\ 0 \\ j \end{bmatrix}$ | $\frac{1}{s_1}\begin{bmatrix} 1 \\ 0 \\ -j \end{bmatrix}$ |

TABLE 33-continued

| | | | precoding matrix W'$_i$ = W$_A$ |
| | | | |
| Rank | TPMI index i | Index j | precoder matrix W' |
|---|---|---|---|
| 2 | 5-10 | 0-5 | $\frac{1}{s_2}\begin{bmatrix}1&1\\0&0\\1&-1\end{bmatrix}$ $\frac{1}{s_2}\begin{bmatrix}1&1\\0&0\\j&-j\end{bmatrix}$ $\frac{1}{s_2}\begin{bmatrix}1&0\\0&1\\1&0\end{bmatrix}$ $\frac{1}{s_2}\begin{bmatrix}1&0\\0&1\\-1&0\end{bmatrix}$ $\frac{1}{s_2}\begin{bmatrix}1&0\\0&1\\j&0\end{bmatrix}$ $\frac{1}{s_2}\begin{bmatrix}1&0\\0&1\\-j&0\end{bmatrix}$ |
| 3 | 11-12 | 0-1 | $\frac{1}{s_3}\begin{bmatrix}1&1&0\\0&0&1\\1&-1&0\end{bmatrix}$ $\frac{1}{s_3}\begin{bmatrix}1&1&0\\0&0&1\\j&-j&0\end{bmatrix}$ |

In one example, a UE can be configured with a full power mode=fullpowermode1, and an UL codebook for Ng=2, where the codebook includes at least one additional TPMI for rank 1 (e.g. index 5) indicating a rank 1 precoder. In one example, the rank 1 precoder is one of precoders in Table 34.

TABLE 34 additional rank 1 precoder for full power mode 1

| | precoder matrix W' | | | |
|---|---|---|---|---|
| Rank | Ex 1 | Ex 2 | E x3 | Ex 4 |
| 1 | $\frac{1}{s_1}\begin{bmatrix}1\\1\\1\end{bmatrix}$ | $\frac{1}{s_1}\begin{bmatrix}1\\1\\j\end{bmatrix}$ | $\frac{1}{s_1}\begin{bmatrix}1\\1\\-1\end{bmatrix}$ | $\frac{1}{s_1}\begin{bmatrix}1\\1\\-j\end{bmatrix}$ |

In one embodiment, the codebook for 3 antenna ports, as described in previous embodiment (or later embodiments), can also be used/configured (to a UE) for DL (e.g. for CSI/PMI reporting based on 3 CSI-RS antenna ports at NW/gNB), or sidelink (SL) (e.g. for CSI/PMI reporting based on 3 CSI-RS antenna ports at a SL UE/device). It can also be used to configure/trigger a CSI report for network energy saving (NES) applications wherein the NW/gNB may want to trigger (e.g. dynamically via MAC CE or DCI) a sub-configurations of the CSI report in which the number of CSI-RS ports is less than that at the NW/gNB. For instance, NW/gNB may trigger a CSI report for 3 CSI-RS ports that are a subset of >3 (e.g. 4, or 8) CSI-RS ports.

Various embodiments of the present disclosure provide for a 3Tx non-coherent codebook design for Ng=3. In one embodiment, the UL codebook includes non-coherent (NC) precoding matrices, and a NC precoding matrix can be defined as a matrix who's each column comprises one non-zero entry and the rest zero entries, e.g., each column is a port selection vector. An example of the NC precoders is shown in Table 35.

TABLE 35

Example of NC precoders

| Rank | TPMI index i | Intermediate precoder matrix W' | | |
|---|---|---|---|---|
| 1 | 0-2 | $\frac{1}{s_1}\begin{bmatrix}1\\0\\0\end{bmatrix}$ | $\frac{1}{s_1}\begin{bmatrix}0\\1\\0\end{bmatrix}$ | $\frac{1}{s_1}\begin{bmatrix}0\\0\\1\end{bmatrix}$ |
| 2 | 0-2 | $\frac{1}{s_2}\begin{bmatrix}1&0\\0&1\\0&0\end{bmatrix}$ | $\frac{1}{s_2}\begin{bmatrix}1&0\\0&0\\0&1\end{bmatrix}$ | $\frac{1}{s_2}\begin{bmatrix}0&0\\1&0\\0&1\end{bmatrix}$ |
| 3 | 0 | $\frac{1}{s_3}\begin{bmatrix}1&0&0\\0&1&0\\0&0&1\end{bmatrix}$ | | |

TABLE 35-continued

Example of NC precoders

| Rank | TPMI index i | Intermediate precoder matrix W' |
|---|---|---|

In one example, a NC 3Tx precoder is indicated via a TPMI, where for maxRank equals to 1, TPMI field is 2 bits and for maxRank equals to 2 or 3, TPMI field is 3 bits.

| maxRank | From Table 35 | Payload (number of bits) |
|---|---|---|
| 1 | 1 layer, TPMI 0-2 | 2 |
| 2 | 1 layer, TPMI 0-2 | 3 |
| | 2 layer, TPMI 0-2 | |
| 3 | 1 layer, TPMI 0-2 | 3 |
| | 2 layer, TPMI 0-2 | |
| | 3 layer, TPMI 0 | |

In one example, a NC 3Tx precoder is indicated via a 3-bit bitmap $b_0b_1b_2$ where a bit $b_i$ is associated with a port i. In one example, when $b_i=1$, the corresponding port i is selected, i.e., non-zero (e.g. value 1), and when $b_i=0$, the corresponding port i is not selected, i.e., zero (e.g. value 0). In one example, when $b_i=0$, the corresponding port i is selected, i.e., non-zero (e.g. value 1), and when $b_i=1$, the corresponding port i is not selected, i.e., zero (e.g. value 0).

In one example, a UE can be configured with a full power mode=fullpowermode1, and an UL codebook for Ng=3, where the codebook includes at least one additional TPMI for rank 1 (e.g. index 5) indicating a rank 1 precoder, and at least one additional TPMI for rank 2 (e.g. index 5) indicating a rank 2 precoder. In one example, the rank 1 precoder is one of precoders in Table 34 and the rank 2 precoder is one of precoders in Table 36.

TABLE 36 additional rank 2 precoder for full power mode 1

| | precoder matrix W' | | | |
|---|---|---|---|---|
| Rank | Ex 1 | Ex 2 | Ex 3 | Ex 4 |
| 2 | $\frac{1}{s_2}\begin{bmatrix}1&0\\0&1\\1&0\end{bmatrix}$ | $\frac{1}{s_2}\begin{bmatrix}1&0\\0&1\\-1&0\end{bmatrix}$ | $\frac{1}{s_2}\begin{bmatrix}1&0\\0&1\\j&0\end{bmatrix}$ | $\frac{1}{s_2}\begin{bmatrix}1&0\\0&1\\-j&0\end{bmatrix}$ |

In one embodiment, the codebook for 3 antenna ports, as described in previous embodiment (or later embodiments), can also be used/configured (to a UE) for DL (e.g. for CSI/PMI reporting based on 3 CSI-RS antenna ports at NW/gNB), or sidelink (SL) (e.g. for CSI/PMI reporting based on 3 CSI-RS antenna ports at a SL UE/device). It can also be used to configure/trigger a CSI report for network energy saving (NES) applications wherein the NW/gNB may want to trigger (e.g. dynamically via MAC CE or DCI) a sub-configurations of the CSI report in which the number of CSI-RS ports is less than that at the NW/gNB. For instance, NW/gNB may trigger a CSI report for 3 CSI-RS ports that are a subset of >3 (e.g. 4, or 8) CSI-RS ports.

Various embodiments of the present disclosure provide for a codebook configuration or codebook subsets. In one example, the UE codebook for $N_g=1$ can be referred to as or configured as full-Coherent (FC). In one example, the UE codebook for $N_g=2$ can be referred to as or configured as partial-Coherent (PC). In one example, the UE codebook for $N_g=3$ can be referred to as or configured as non-Coherent (NC). In one example, the UE codebook including both $N_g=(n_1, n_2)=(1,2)$ precoders can be referred to as or configured as fullAndPartial-Coherent (FC-PC). In one example, the UE codebook including both $N_g=(n_1, n_2)=(1,3)$ precoders can be referred to as or configured as fullAndNon-Coherent (FC-NC). In one example, the UE codebook including both $N_g=(n_1, n_2)=(2,3)$ precoders can be referred to as or configured as partialAndNon-Coherent (PC-NC). In one example, the UE codebook including both $N_g=(n_1, n_2, n_3)=(1,2,3)$ precoders can be referred to as or configured as fullAndPartialAndNon-Coherent (FC-PC-NC).

When configured, A or/and B can be used interchangeably, where A or/and B is according to one of the following.

$N_g=1$ or/and full-Coherent (FC)

$N_g=2$ or/and partial-Coherent (PC)

$N_g=3$ or/and non-Coherent (NFC)

$N_g=(n_1,n_2)=(1,2)$ or/and fullAndPartial-Coherent (FC-PC)

$N_g=(n_1, n_2)=(1,3)$ or/and fullAndNon-Coherent (FC-NC)

$N_g=(n_1,n_2)=(2,3)$ or/and partialAndNon-Coherent (PC-NC)

$N_g=(n_1, n_2, n_3)=(1,2,3)$ or/and fullAndPartialAndNon-Coherent (FC-PC-NC).

In one embodiment IV, a UE can be configured (e.g. via higher layer) with an UL codebook for 3 antenna ports, including all of or a subset of 3Tx precoders described above, according to at least one of the following examples.

In one example, the configured UL codebook for 3 antenna ports corresponds to only one $N_g$ value.

In one example, the one $N_g$ value is fixed to $N_g=1$.

In one example, the one $N_g$ value is fixed to $N_g=2$.

In one example, the one $N_g$ value is fixed to $N_g=3$.

In one example, the one $N_g$ value is $N_g=n$, where n is configured (e.g. via higher layer). This configuration can be subject to a UE capability reporting. Hence, the configured n value belongs to a set of one or multiple values that the UE can support. The UE can be allowed to report one or more than one values of $N_g$ (or n) via UE capability reporting.

In one example, the configured UL codebook for 3 antenna ports can correspond to two $N_g$ values.

In one example, the two $N_g$ values are fixed to $N_g=1, 2$.

In one example, the two $N_g$ values are fixed to $N_g=1, 3$.

In one example, the two $N_g$ values are fixed to $N_g=2, 3$.

In one example, the two $N_g$ values are $(n_1, n_2)$, where $(n_1, n_2)$ is configured (e.g. via higher layer). This configuration can be subject to a UE capability reporting. Hence, the configured $(n_1, n_2)$ values belong to a set of multiple values that the UE can support. The UE can be allowed to report one or more than one values of $N_g$ (or n) via UE capability reporting. The UE can report a set of values that the UE can support, and $(n_1, n_2)$ can be any two values from the set. Or the UE can report a set of values for $(n_1, n_2)$.

In one example, the configured UL codebook for 3 antenna ports can correspond to one or two $N_g$ values.

In one example, when the one $N_g$ value, the codebook is according to one of the examples described above.

In one example, when the two $N_g$ values, the codebook is according to one of the examples described above.

In one example, the configured UL codebook for 3 antenna ports can correspond to three $N_g$ values.

In one example, the three $N_g$ values are fixed to $N_g=1, 2, 3$.

In one example, the configured UL codebook for 3 antenna ports can correspond to one or three $N_g$ values.

In one example, when the one $N_g$ value, the codebook is according to one of the examples described above.

In one example, when the three $N_g$ values, the codebook is according to one of the examples described above.

In one example, the configured UL codebook for 3 antenna ports can correspond to two or three $N_g$ values.

In one example, when the two $N_g$ values, the codebook is according to one of the examples described above.

In one example, when the three $N_g$ values, the codebook is according to one of the examples described above.

In one example, the configured UL codebook for 3 antenna ports can correspond to one, two, or three $N_g$ values.

In one example, when the one $N_g$ value, the codebook is according to one of the examples described above.

In one example, when the two $N_g$ values, the codebook is according to one of the examples described above.

In one example, when the three $N_g$ values, the codebook is according to one of the examples described above.

In one embodiment, the codebook for 3 antenna ports, as described in previous embodiment (or later embodiments), can also be used/configured (to a UE) for DL (e.g. for CSI/PMI reporting based on 3 CSI-RS antenna ports at NW/gNB), or sidelink (SL) (e.g. for CSI/PMI reporting based on 3 CSI-RS antenna ports at a SL UE/device). It can also be used to configure/trigger a CSI report for network energy saving (NES) applications wherein the NW/gNB may want to trigger (e.g. dynamically via MAC CE or DCI) a sub-configurations of the CSI report in which the number of CSI-RS ports is less than that at the NW/gNB. For instance, NW/gNB may trigger a CSI report for 3 CSI-RS ports that are a subset of >3 (e.g. 4, or 8) CSI-RS ports.

Various embodiments of the present disclosure provide for a SRS configuration. In one embodiment, a UE with 3 (or 5 or 7 or an odd number of) antenna ports can be configured (e.g. via higher layer) with at least one SRS-ResourceSet(s) applicable for PUSCH scheduled by DCI format 0_1 and DCI format 0_2, e.g. based on (defined by the entries of) the higher layer parameter srs-ResourceSetToAddModList and srs-ResourceSetToAddModListDCI-0-2 in SRS-config, respectively. In one example, only one SRS resource set can be configured in srs-ResourceSetToAddModList with higher layer parameter usage in SRS-ResourceSet set to 'codebook', and only one SRS resource set can be configured in srs-ResourceSetToAddModListDCI-0-2 with higher layer parameter usage in SRS-ResourceSet set to 'codebook'.

When the UE is configured with the higher layer parameter txConfig set to 'codebook', the UE is configured with at least one SRS resource. The indicated SRI in slot n is associated with the most recent transmission of SRS resource identified by the SRI, where the SRS resource is prior to the PDCCH carrying the SRI.

For codebook-based transmission, only one SRS resource can be indicated based on the SRI from within the SRS resource set. In one example, the maximum number of configured SRS resources for codebook-based transmission is fixed (e.g. 2).

The UE transmits PUSCH using the same antenna port(s) as the SRS port(s) in the SRS resource indicated by the DCI format 0_1 or 0_2 or by configuredGrantConfig according to clause 6.1.2.3, TS 38.214.

In one example, when multiple SRS resources are configured by SRS-ResourceSet with usage set to 'codebook', the UE expects that higher layer parameters nrofSRS-Ports in SRS-Resource in SRS-ResourceSet is configured with the same value for all these SRS resources.

At least one of the following examples can be used/configured (subject to UE capability) regarding the SRS resource(s) configured for the codebook-based UL transmission using 3 antenna ports at the UE.

In one example, a number of SRS ports (indicated via the SRI) can be the same as the number ports at the UE. Hence, when the UE has 3 antenna ports (as described in this disclosure), the configured SRS resource(s) has 3 SRS antenna ports.

In one example, the SRS resource with 3 SRS ports can be configured based on a new 3-port SRS design. In this case, the SRI indicate one SRS resource with 3 SRS ports. In one example, this 3-port SRS resource can simply be based on three ports of a 4-port SRS resource. In one example, one the four ports is muted (i.e. UE can ignore or not expected to transmit on). The mapping between 3 antenna ports ($p_0$, $p_1$, $p_2$) at the UE and 3 out of 4 SRS ports ($q_0$, $q_1$, $q_2$, $q_3$) of one SRS resources can be as follows.

In one example, the mapping is fixed, for example, to A1 in Table 37.

In one example, the mapping is configured, for example, from A1, A2, A3, and A4 in Table 37.

In one example, the mapping is reported by the UE, for example, from to A1, A2, A3, and A4 in Table 37, via UE capability reporting.

In one example, the SRS resource with 3 SRS ports can be configured based on two SRS resources (s1, s2), s1 with one SRS port, and s2 with 2 SRS ports. In this case, the SRI indicate two SRS resources (s1, s2). The mapping between 3 antenna ports ($p_0$, $p_1$, $p_2$) at the UE and SRS ports of two SRS resources ($q_0$, $q_1$ of s1 and $r_0$ of s2) can be as follows.

In one example, the mapping is fixed, for example, to B1 in Table 38.

In one example, the mapping is configured, for example, from B1, B2, and B3 in Table 38.

In one example, the mapping is reported by the UE, for example, from to B1, B2, and B3 in Table 38, via UE capability reporting.

In one example, a number of SRS ports of a SRS resource (indicated via the SRI when >1 SRS resources are configured) can be more than the number ports at the UE. Hence, when the UE has 3 antenna ports (as described in this disclosure), the configured SRS resource(s) can have >3 SRS antenna ports.

In one example, the SRS resource with 4 SRS ports can be configured (hence indicated via SRI). In one example, one the four ports is muted (i.e. UE can ignore or not expected to transmit on). The mapping between 3 antenna ports ($p_0$, $p_1$, $p_2$) at the UE and 3 out of 4 SRS ports ($q_0$, $q_1$, $q_2$, $q_3$) of one SRS resources can be as follows.

In one example, the mapping is fixed, for example, to A1 in Table 37. In one example, always a same port is muted (e.g. $4^{th}$ port).

In one example, the mapping is configured, for example, from A1, A2, A3, and A4 in Table 37.

In one example, the mapping is reported by the UE, for example, from to A1, A2, A3, and A4 in Table 37, via UE capability reporting.

TABLE 37

| Example of mapping | $p_0$ | $p_1$ | $p_2$ |
|---|---|---|---|
| A1 | $q_0$ | $q_1$ | $q_2$ |
| A2 | $q_0$ | $q_1$ | $q_3$ |
| A3 | $q_0$ | $q_2$ | $q_3$ |
| A4 | $q_1$ | $q_2$ | $q_3$ |

TABLE 38

| Example of mapping | $p_0$ | $p_1$ | $p_2$ |
|---|---|---|---|
| B1 | $q_0$ | $q_1$ | $r_0$ |
| B2 | $r_0$ | $q_0$ | $q_1$ |
| B3 | $q_0$ | $r_0$ | $q_1$ |

In one embodiment, the SRS configuration, as described in previous embodiment, can also be used/extended for DL RS configuration (e.g. CSI-RS resource with 3 CSI-RS antenna ports at NW/gNB), or sidelink (SL) (e.g. for CSI-RS resource with 3 CSI-RS antenna ports at a SL UE/device). For instance, this can simply be by replacing SRS resource with CSI-RS resource in the previous embodiment.

FIG. 8 illustrates an example method 800 performed by a UE in a wireless communication system according to embodiments of the present disclosure. The method 800 of FIG. 8 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 800 is for illustration only and other embodiments can be used without departing from the scope of the present disclosure.

The method 800 begins with the UE transmitting capability information about an UL codebook for 3 antenna ports (810). The UE then receives a configuration indicating a SRS resource set comprising at least one SRS resource with 4 SRS ports (820). For example, in 820, one of the 4 SRS ports is muted, and the muted port is a fourth of the 4 SRS ports. The UE then transmits a SRS from 3 of the 4 SRS ports (830).

The UE then receives an indication indicating a TPMI for transmission of PUSCH (840). For example, in 840, the TPMI indicates a precoding matrix from the UL codebook for the 3 antenna ports. In various embodiments, the at least one SRS resource is two SRS resources, and the indication includes an SRI indicating one of the two SRS resources.

The UE then transmits the PUSCH based on the indicated TPMI (850). In various embodiments, a payload of the TPMI=2 bits when maxRank=1, the payload of the TPMI=3 bits when maxRank=2 or 3, and maxRank is higher layer configured. In various embodiments, when a number of layers for transmission of the PUSCH is one, transmission of the PUSCH is with transform precoding enabled or disabled. For example, when transform precoding is enabled, transmission of the PUSCH is based on DFT-s-OFDM, and when transform precoding is disabled, transmission of the PUSCH is based on CP-OFDM. In various embodiments, the UL codebook for the 3 antenna ports includes PC precoding matrices comprising both zero and non-zero entries in each column of the PC precoding matrices. The PC precoding matrices are obtained by partitioning the 3 antenna ports into N_g=2 groups, a first group comprising 2 of the 3 antenna ports and a second group comprising 1 of the 3 antenna port. A layer of the PUSCH transmission is transmitted from either the first or the second group. The UL codebook for the 3 antenna ports includes the PC precoding matrices given by at least one of a table.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising
a processor; and
a transceiver operably coupled to the processor, the transceiver configured to:
    transmit capability information about an uplink (UL) codebook for 3 antenna ports,
    receive a configuration indicating a sounding resource signal (SRS) resource set comprising at least one SRS resource with 4 SRS ports, wherein one of the 4 SRS ports is muted,
    transmit a SRS from 3 of the 4 SRS ports,
    receive an indication indicating a transmit precoding matrix indicator (TPMI) for transmission of a physical uplink shared channel (PUSCH), and transmit the PUSCH based on the indicated TPMI,
    wherein the TPMI indicates a precoding matrix from the UL codebook for the 3 antenna ports, and
    wherein:
        a payload of the TPMI=2 bits when maxRank=1,
        the payload of the TPMI=3 bits when maxRank=2 or 3, and
        maxRank is higher layer configured.

2. The UE of claim 1, wherein the muted port is a fourth of the 4 SRS ports.

3. The UE of claim 1, wherein the UL codebook for the 3 antenna ports includes non-coherent (NC) precoding matrices given by:

| Rank | TPMI index i | Precoder matrix W |
|---|---|---|
| 1 | 0-2 | $\frac{1}{\sqrt{3}}\begin{bmatrix}1\\0\\0\end{bmatrix}$ $\quad$ $\frac{1}{\sqrt{3}}\begin{bmatrix}0\\1\\0\end{bmatrix}$ $\quad$ $\frac{1}{\sqrt{3}}\begin{bmatrix}0\\0\\1\end{bmatrix}$ |
| 2 | 0-2 | $\frac{1}{\sqrt{3}}\begin{bmatrix}1&0\\0&1\\0&0\end{bmatrix}$ $\quad$ $\frac{1}{\sqrt{3}}\begin{bmatrix}1&0\\0&0\\0&1\end{bmatrix}$ $\quad$ $\frac{1}{\sqrt{3}}\begin{bmatrix}0&0\\1&0\\0&1\end{bmatrix}$ |
| 3 | 0 | $\frac{1}{\sqrt{3}}\begin{bmatrix}1&0&0\\0&1&0\\0&0&1\end{bmatrix}$. |

4. The UE of claim 1, wherein:
the at least one SRS resource is two SRS resources, and
the indication includes an SRS resource indicator (SRI) indicating one of the two SRS resources.

5. The UE of claim 1, wherein:
when a number of layers for transmission of the PUSCH is one, transmission of the PUSCH is with transform precoding enabled or disabled,
when transform precoding is enabled, transmission of the PUSCH is based on discrete Fourier transform spread orthogonal frequency domain multiplexing (DFT-s-OFDM), and
when transform precoding is disabled, transmission of the PUSCH is based on cyclic prefix orthogonal frequency domain multiplexing (CP-OFDM).

6. The UE of claim 1, wherein:
the UL codebook for the 3 antenna ports includes partial coherent (PC) precoding matrices comprising both zero and non-zero entries in each column of the PC precoding matrices,
the PC precoding matrices are obtained by partitioning the 3 antenna ports into $N_g$=2 groups, a first group comprising 2 of the 3 antenna ports and a second group comprising 1 of the 3 antenna port,
a layer of the PUSCH transmission is transmitted from either the first or the second group, and
the UL codebook for the 3 antenna ports includes the PC precoding matrices given by at least one of TABLE A, TABLE B, and TABLE C, given by:

TABLE A

| Rank | TPMI index i | Index j | precoder matrix W' |
|---|---|---|---|
| 1 | 0-4 | 0-4 | $\frac{1}{s_1}\begin{bmatrix} \overline{W}_{1,0} \\ 0 \end{bmatrix} = \frac{1}{s_1}\begin{bmatrix} 1 \\ 1 \\ 0 \end{bmatrix}$   $\frac{1}{s_1}\begin{bmatrix} \overline{W}_{1,1} \\ 0 \end{bmatrix} = \frac{1}{s_1}\begin{bmatrix} 1 \\ -1 \\ 0 \end{bmatrix}$   $\frac{1}{s_1}\begin{bmatrix} \overline{W}_{1,2} \\ 0 \end{bmatrix} = \frac{1}{s_1}\begin{bmatrix} 1 \\ j \\ 0 \end{bmatrix}$   $\frac{1}{s_1}\begin{bmatrix} \overline{W}_{1,3} \\ 0 \end{bmatrix} = \frac{1}{s_1}\begin{bmatrix} 1 \\ -j \\ 0 \end{bmatrix}$   $\frac{1}{s_1}\begin{bmatrix} 0_{2\times1} \\ 1 \end{bmatrix} = \frac{1}{s_1}\begin{bmatrix} 0 \\ 0 \\ 1 \end{bmatrix}$ |
| 2 | 5-10 | 0-5 | $\frac{1}{s_2}\begin{bmatrix} \overline{W}_{2,0} \\ 0_{1\times2} \end{bmatrix} = \frac{1}{s_2}\begin{bmatrix} 1 & 1 \\ 1 & -1 \\ 0 & 0 \end{bmatrix}$   $\frac{1}{s_2}\begin{bmatrix} \overline{W}_{2,1} \\ 0_{1\times2} \end{bmatrix} = \frac{1}{s_2}\begin{bmatrix} 1 & 1 \\ j & -j \\ 0 & 0 \end{bmatrix}$   $\frac{1}{s_2}\begin{bmatrix} \overline{W}_{1,0} & 0_{2\times1} \\ 0 & 1 \end{bmatrix} = \frac{1}{s_2}\begin{bmatrix} 1 & 0 \\ 1 & 0 \\ 0 & 1 \end{bmatrix}$   $\frac{1}{s_2}\begin{bmatrix} \overline{W}_{1,1} & 0_{2\times1} \\ 0 & 1 \end{bmatrix} = \frac{1}{s_2}\begin{bmatrix} 1 & 0 \\ -1 & 0 \\ 0 & 1 \end{bmatrix}$   $\frac{1}{s_2}\begin{bmatrix} \overline{W}_{1,2} & 0_{2\times1} \\ 0 & 1 \end{bmatrix} = \frac{1}{s_2}\begin{bmatrix} 1 & 0 \\ j & 0 \\ 0 & 1 \end{bmatrix}$   $\frac{1}{s_2}\begin{bmatrix} \overline{W}_{1,3} & 0_{2\times1} \\ 0 & 1 \end{bmatrix} = \frac{1}{s_2}\begin{bmatrix} 1 & 0 \\ -j & 0 \\ 0 & 1 \end{bmatrix}$ |
| 3 | 11-12 | 0-1 | $\frac{1}{s_3}\begin{bmatrix} \overline{W}_{2,0} & 0_{2\times1} \\ 0_{1\times2} & 1 \end{bmatrix} = \frac{1}{s_3}\begin{bmatrix} 1 & 1 & 0 \\ 1 & -1 & 0 \\ 0 & 0 & 1 \end{bmatrix}$   $\frac{1}{s_3}\begin{bmatrix} \overline{W}_{2,10} & 0_{2\times1} \\ 0_{1\times2} & 1 \end{bmatrix} = \frac{1}{s_3}\begin{bmatrix} 1 & 1 & 0 \\ j & -j & 0 \\ 0 & 0 & 1 \end{bmatrix}$ |

TABLE B

| Rank | TPMI index i | Index j | precoder matrix W' |
|---|---|---|---|
| 1 | 0-4 | 0-4 | $\frac{1}{s_1}\begin{bmatrix} 1 \\ 0_{2\times1} \end{bmatrix} = \frac{1}{s_1}\begin{bmatrix} 1 \\ 0 \\ 0 \end{bmatrix}$   $\frac{1}{s_1}\begin{bmatrix} 0 \\ \overline{W}_{1,0} \end{bmatrix} = \frac{1}{s_1}\begin{bmatrix} 0 \\ 1 \\ 1 \end{bmatrix}$   $\frac{1}{s_1}\begin{bmatrix} 0 \\ \overline{W}_{1,1} \end{bmatrix} = \frac{1}{s_1}\begin{bmatrix} 0 \\ 1 \\ -1 \end{bmatrix}$   $\frac{1}{s_1}\begin{bmatrix} 0 \\ \overline{W}_{1,20} \end{bmatrix} = \frac{1}{s_1}\begin{bmatrix} 0 \\ 1 \\ j \end{bmatrix}$   $\frac{1}{s_1}\begin{bmatrix} 0 \\ \overline{W}_{1,3} \end{bmatrix} = \frac{1}{s_1}\begin{bmatrix} 0 \\ 1 \\ -j \end{bmatrix}$ |
| 2 | 5-10 | 0-5 | $\frac{1}{s_2}\begin{bmatrix} 0_{1\times2} \\ \overline{W}_{2,0} \end{bmatrix} = \frac{1}{s_2}\begin{bmatrix} 0 & 0 \\ 1 & 1 \\ 1 & -1 \end{bmatrix}$   $\frac{1}{s_2}\begin{bmatrix} 0_{1\times2} \\ \overline{W}_{2,1} \end{bmatrix} = \frac{1}{s_2}\begin{bmatrix} 0 & 0 \\ 1 & 1 \\ j & -j \end{bmatrix}$   $\frac{1}{s_2}\begin{bmatrix} 0 & 1 \\ \overline{W}_{1,0} & 0_{2\times1} \end{bmatrix} = \frac{1}{s_2}\begin{bmatrix} 0 & 1 \\ 1 & 0 \\ 1 & 0 \end{bmatrix}$   $\frac{1}{s_2}\begin{bmatrix} 0 & 1 \\ \overline{W}_{1,1} & 0_{2\times1} \end{bmatrix} = \frac{1}{s_2}\begin{bmatrix} 0 & 1 \\ 1 & 0 \\ -1 & 0 \end{bmatrix}$   $\frac{1}{s_2}\begin{bmatrix} 0 & 1 \\ \overline{W}_{1,2} & 0_{2\times1} \end{bmatrix} = \frac{1}{s_2}\begin{bmatrix} 0 & 1 \\ 1 & 0 \\ j & 0 \end{bmatrix}$   $\frac{1}{s_2}\begin{bmatrix} 0 & 1 \\ \overline{W}_{1,3} & 0_{2\times1} \end{bmatrix} = \frac{1}{s_2}\begin{bmatrix} 0 & 1 \\ 1 & 0 \\ -j & 0 \end{bmatrix}$ |
| 3 | 11-12 | 0-1 | $\frac{1}{s_3}\begin{bmatrix} 0_{1\times2} & 1 \\ \overline{W}_{2,0} & 0_{2\times1} \end{bmatrix} = \frac{1}{s_3}\begin{bmatrix} 0 & 0 & 1 \\ 1 & 1 & 0 \\ 1 & -1 & 0 \end{bmatrix}$   $\frac{1}{s_3}\begin{bmatrix} 0_{1\times2} & 1 \\ \overline{W}_{2,0} & 0_{2\times1} \end{bmatrix} = \frac{1}{s_3}\begin{bmatrix} 0 & 0 & 1 \\ 1 & 1 & 0 \\ j & -j & 0 \end{bmatrix}$ |

TABLE C

| Rank | TPMI index i | Index j | precoder matrix W' |
|---|---|---|---|
| 1 | 0-4 | 0-4 | $\frac{1}{s_1}\begin{bmatrix} 0 \\ 1 \\ 0 \end{bmatrix}$   $\frac{1}{s_1}\begin{bmatrix} 1 \\ 0 \\ 1 \end{bmatrix}$   $\frac{1}{s_1}\begin{bmatrix} 1 \\ 0 \\ -1 \end{bmatrix}$   $\frac{1}{s_1}\begin{bmatrix} 1 \\ 0 \\ j \end{bmatrix}$   $\frac{1}{s_1}\begin{bmatrix} 1 \\ 0 \\ -j \end{bmatrix}$ |
| 2 | 5-10 | 0-5 | $\frac{1}{s_2}\begin{bmatrix} 1 & 1 \\ 0 & 0 \\ 1 & -1 \end{bmatrix}$   $\frac{1}{s_2}\begin{bmatrix} 1 & 1 \\ 0 & 0 \\ j & -j \end{bmatrix}$   $\frac{1}{s_2}\begin{bmatrix} 1 & 0 \\ 0 & 1 \\ 1 & 0 \end{bmatrix}$   $\frac{1}{s_2}\begin{bmatrix} 1 & 0 \\ 0 & 1 \\ -1 & 0 \end{bmatrix}$   $\frac{1}{s_2}\begin{bmatrix} 1 & 0 \\ 0 & 1 \\ j & 0 \end{bmatrix}$   $\frac{1}{s_2}\begin{bmatrix} 1 & 0 \\ 0 & 1 \\ -j & 0 \end{bmatrix}$ |
| 3 | 11-12 | 0-1 | $\frac{1}{s_3}\begin{bmatrix} 1 & 1 & 0 \\ 0 & 0 & 1 \\ 1 & -1 & 0 \end{bmatrix}$   $\frac{1}{s_3}\begin{bmatrix} 1 & 1 & 0 \\ 0 & 0 & 1 \\ j & -j & 0 \end{bmatrix}$ |

65 where $s_1$, $s_2$, and $s_3$ are scaling factors belonging to $[\sqrt{3,3}]$.

7. The UE of claim 1, wherein the UL codebook for the 3 antenna ports includes full coherent (FC) precoding matrices comprising all non-zero entries, based on length-3 DFT vectors $$p_{1,i} = \begin{bmatrix} 1 \\ e^{j\frac{2\pi i}{3O_1}} \\ e^{j\frac{4\pi i}{3O_1}} \end{bmatrix},$$

i=0, 1, . . . , $3O_1-1$, where:

a rank 1 precoder is given by $$\frac{1}{\sqrt{3}} p_{1,i}$$

where $p_{1,i}$ is based on all of or a subset of the following table

| $O_1$ | $P_{1,0}$ | $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ | $P_{1,10}$ | $P_{1,11}$ |
|---|---|---|---|---|---|---|---|---|---|---|---|---|
| 1 | $\begin{bmatrix}1\\1\\1\end{bmatrix}$ | $\begin{bmatrix}1\\e^{j2\pi\frac{1}{3}}\\e^{j2\pi\frac{2}{3}}\end{bmatrix}$ | $\begin{bmatrix}1\\e^{j2\pi\frac{2}{3}}\\e^{j2\pi\frac{4}{3}}\end{bmatrix}$ | | | | | | | | | |
| 2 | $\begin{bmatrix}1\\1\\1\end{bmatrix}$ | $\begin{bmatrix}1\\e^{j2\pi\frac{1}{6}}\\e^{j2\pi\frac{1}{3}}\end{bmatrix}$ | $\begin{bmatrix}1\\e^{j2\pi\frac{1}{3}}\\e^{j2\pi\frac{2}{3}}\end{bmatrix}$ | $\begin{bmatrix}1\\e^{j\pi}\\e^{j2\pi}\end{bmatrix}$ | $\begin{bmatrix}1\\e^{j2\pi\frac{2}{3}}\\e^{j2\pi\frac{4}{3}}\end{bmatrix}$ | $\begin{bmatrix}1\\e^{j2\pi\frac{5}{6}}\\e^{j2\pi\frac{5}{3}}\end{bmatrix}$ | | | | | | |
| 4 | $\begin{bmatrix}1\\1\\1\end{bmatrix}$ | $\begin{bmatrix}1\\e^{j2\pi\frac{1}{12}}\\e^{j2\pi\frac{1}{6}}\end{bmatrix}$ | $\begin{bmatrix}1\\e^{j2\pi\frac{1}{6}}\\e^{j2\pi\frac{1}{3}}\end{bmatrix}$ | $\begin{bmatrix}1\\e^{j2\pi\frac{1}{4}}\\e^{j2\pi\frac{1}{2}}\end{bmatrix}$ | $\begin{bmatrix}1\\e^{j2\pi\frac{1}{3}}\\e^{j2\pi\frac{2}{3}}\end{bmatrix}$ | $\begin{bmatrix}1\\e^{j2\pi\frac{5}{12}}\\e^{j2\pi\frac{5}{6}}\end{bmatrix}$ | $\begin{bmatrix}1\\e^{j\pi}\\e^{j2\pi}\end{bmatrix}$ | $\begin{bmatrix}1\\e^{j2\pi\frac{7}{12}}\\e^{j2\pi\frac{7}{6}}\end{bmatrix}$ | $\begin{bmatrix}1\\e^{j2\pi\frac{2}{3}}\\e^{j2\pi\frac{4}{3}}\end{bmatrix}$ | $\begin{bmatrix}1\\e^{j2\pi\frac{3}{4}}\\e^{j2\pi\frac{3}{2}}\end{bmatrix}$ | $\begin{bmatrix}1\\e^{j2\pi\frac{5}{6}}\\e^{j2\pi\frac{10}{3}}\end{bmatrix}$ | $\begin{bmatrix}1\\e^{j2\pi\frac{11}{12}}\\e^{j2\pi\frac{11}{6}}\end{bmatrix}$, | a rank 2 precoding matrix is given by $$\frac{1}{\sqrt{6}} p_{2,i}$$

where $p_{2,i}$ is based on all of or a subset of the following table

| $O_1$ | $P_{2,0}$ | $P_{2,1}$ | $P_{2,2}$ | $P_{2,3}$ | $P_{2,4}$ | $P_{2,5}$ |
|---|---|---|---|---|---|---|
| 1 | $[P_{1,0}\,P_{1,1}]$ | $[P_{1,0}\,P_{1,2}]$ | $[P_{1,1}\,P_{1,2}]$ | | | |
| 2 | $[P_{1,0}\,P_{1,2}]$ | $[P_{1,0}\,P_{1,4}]$ | $[P_{1,2}\,P_{1,4}]$ | $[P_{1,1}\,P_{1,3}]$ | $[P_{1,1}\,P_{1,5}]$ | $[P_{1,3}\,P_{1,5}]$ |
| 4 | $[P_{1,0}\,P_{1,4}]$ | $[P_{1,0}\,P_{1,8}]$ | $[P_{1,4}\,P_{1,8}]$ | $[P_{1,1}\,P_{1,5}]$ | $[P_{1,1}\,P_{1,9}]$ | $[P_{1,5}\,P_{1,9}]$ |

| | $P_{2,6}$ | $P_{2,7}$ | $P_{2,8}$ | $P_{2,9}$ | $P_{2,10}$ | $P_{2,11}$ |
|---|---|---|---|---|---|---|
| | $[P_{1,2}\,P_{1,6}]$ | $[P_{1,2}\,P_{1,10}]$ | $[P_{1,6}\,P_{1,10}]$ | $[P_{1,3}\,P_{1,7}]$ | $[P_{1,3}\,P_{1,11}]$ | $[P_{1,7}\,P_{1,11}]$, | and a rank 3 precoding matrix is given by $$\frac{1}{3} p_{3,i}$$

where $p_{3,i}$ is based on all of or a subset of the following table

| $O_1$ | P3,0 | ?3,1 | P3,2 | P3,3 |
|---|---|---|---|---|
| 1 | $[P_{1,0}\,P_{1,1}\,P_{1,2}]$ | | | |
| 2 | $[P_{1,0}\,P_{1,2}\,P_{1,4}]$ | $[P_{1,1}\,P_{1,3}\,P_{1,5}]$ | | |
| 4 | $[P_{1,0}\,P_{1,4}\,P_{1,8}]$ | $[P_{1,1}\,P_{1,5}\,P_{1,9}]$ | $[P_{1,2}\,P_{1,6}\,P_{1,10}]$ | $[P_{1,3}\,P_{1,7}\,P_{1,11}]$. |

8. A base station (BS) comprising a processor; and a transceiver operably coupled to the processor, the transceiver configured to:

receive capability information about an uplink (UL) codebook for 3 antenna ports, transmit a configuration indicating a sounding resource signal (SRS) resource set comprising at least one SRS resource with 4 SRS ports, wherein one of the 4 SRS ports is muted, receive a SRS from 3 of the 4 SRS ports, transmit an indication indicating a transmit precoding matrix indicator (TPMI) for transmission of a physical uplink shared channel (PUSCH), and receive the PUSCH based on the indicated TPMI, wherein the TPMI indicates a precoding matrix from the UL codebook for the 3 antenna ports, and wherein:

a payload of the TPMI=2 bits when maxRank=1, the payload of the TPMI=3 bits when maxRank=2 or 3, and maxRank is higher layer configured.

9. The BS of claim 8, wherein the muted port is a fourth of the 4 SRS ports.

10. The BS of claim 8, wherein the UL codebook for the 3 antenna ports includes non-coherent (NC) precoding matrices given by:

| Rank | TPMI index i | Precoder matrix W | | |
|---|---|---|---|---|
| 1 | 0-2 | $\frac{1}{\sqrt{3}}\begin{bmatrix}1\\0\\0\end{bmatrix}$ | $\frac{1}{\sqrt{3}}\begin{bmatrix}0\\1\\0\end{bmatrix}$ | $\frac{1}{\sqrt{3}}\begin{bmatrix}0\\0\\1\end{bmatrix}$ |
| 2 | 0-2 | $\frac{1}{\sqrt{3}}\begin{bmatrix}1&0\\0&1\\0&0\end{bmatrix}$ | $\frac{1}{\sqrt{3}}\begin{bmatrix}1&0\\0&0\\0&1\end{bmatrix}$ | $\frac{1}{\sqrt{3}}\begin{bmatrix}0&0\\1&0\\0&1\end{bmatrix}$ |

-continued

| Rank | TPMI index i | Precoder matrix W |
|---|---|---|
| 3 | 0 | $\dfrac{1}{\sqrt{3}}\begin{bmatrix} 1 & 0 & 0 \\ 0 & 1 & 0 \\ 0 & 0 & 1 \end{bmatrix}$. |

11. The BS of claim 8, wherein:

the at least one SRS resource is two SRS resources, and the indication includes an SRS resource indicator (SRI) indicating one of the two SRS resources.

12. The BS of claim 8, wherein:

when a number of layers for transmission of the PUSCH is one, reception of the PUSCH is with transform precoding enabled or disabled, when transform precoding is enabled, reception of the PUSCH is based on discrete Fourier transform spread orthogonal frequency domain multiplexing (DFT-s-OFDM), and when transform precoding is disabled, reception of the PUSCH is based on cyclic prefix orthogonal frequency domain multiplexing (CP-OFDM).

13. The BS of claim 8, wherein:

the UL codebook for the 3 antenna ports includes partial coherent (PC) precoding matrices comprising both zero and non-zero entries in each column of the PC precoding matrices, the PC precoding matrices are obtained by partitioning the 3 antenna ports into $N_g=2$ groups, a first group comprising 2 of the 3 antenna ports and a second group comprising 1 of the 3 antenna port, a layer of the PUSCH transmission is transmitted from either the first or the second group, and the UL codebook for the 3 antenna ports includes the PC precoding matrices given by at least one of TABLE A, TABLE B, and TABLE C, given by:

TABLE A

| Rank | TPMI index i | Index I | precoder matrix W' | | | | |
|---|---|---|---|---|---|---|---|
| 1 | 0-4 | 0-4 | $\dfrac{1}{s_1}\begin{bmatrix} W_{1,0} \\ 0 \end{bmatrix} = \dfrac{1}{s_1}\begin{bmatrix} 1 \\ 1 \\ 0 \end{bmatrix}$ | $\dfrac{1}{s_1}\begin{bmatrix} W_{1,1} \\ 0 \end{bmatrix} = \dfrac{1}{s_1}\begin{bmatrix} 1 \\ -1 \\ 0 \end{bmatrix}$ | $\dfrac{1}{s_1}\begin{bmatrix} W_{1,2} \\ 0 \end{bmatrix} = \dfrac{1}{s_1}\begin{bmatrix} 1 \\ j \\ 0 \end{bmatrix}$ | $\dfrac{1}{s_1}\begin{bmatrix} W_{1,3} \\ 0 \end{bmatrix} = \dfrac{1}{s_1}\begin{bmatrix} 1 \\ -j \\ 0 \end{bmatrix}$ | $\dfrac{1}{s_1}\begin{bmatrix} 0_{2\times1} \\ 1 \end{bmatrix} = \dfrac{1}{s_1}\begin{bmatrix} 0 \\ 0 \\ 1 \end{bmatrix}$ |
| 2 | 5-10 | 0-5 | $\dfrac{1}{s_2}\begin{bmatrix} W_{2,0} \\ 0_{1\times2} \end{bmatrix} = \dfrac{1}{s_2}\begin{bmatrix} 1 & 1 \\ 1 & -1 \\ 0 & 0 \end{bmatrix}$ | $\dfrac{1}{s_2}\begin{bmatrix} W_{2,1} \\ 0_{1\times2} \end{bmatrix} = \dfrac{1}{s_2}\begin{bmatrix} 1 & 1 \\ j & -j \\ 0 & 0 \end{bmatrix}$ | $\dfrac{1}{s_2}\begin{bmatrix} W_{1,0} & 0_{2\times1} \\ 0 & 1 \end{bmatrix} = \dfrac{1}{s_2}\begin{bmatrix} 1 & 0 \\ 1 & 0 \\ 0 & 1 \end{bmatrix}$ | $\dfrac{1}{s_2}\begin{bmatrix} W_{1,1} & 0_{2\times1} \\ 0 & 1 \end{bmatrix} = \dfrac{1}{s_2}\begin{bmatrix} 1 & 0 \\ -1 & 0 \\ 0 & 1 \end{bmatrix}$ | $\dfrac{1}{s_2}\begin{bmatrix} W_{1,2} & 0_{2\times1} \\ 0 & 1 \end{bmatrix} = \dfrac{1}{s_2}\begin{bmatrix} 1 & 0 \\ j & 0 \\ 0 & 1 \end{bmatrix}$ | $\dfrac{1}{s_2}\begin{bmatrix} W_{1,3} & 0_{2\times1} \\ 0 & 1 \end{bmatrix} = \dfrac{1}{s_2}\begin{bmatrix} 1 & 0 \\ -j & 0 \\ 0 & 1 \end{bmatrix}$ |
| 3 | 11-12 | 0-1 | $\dfrac{1}{s_3}\begin{bmatrix} W_{2,0} & 0_{2\times1} \\ 0_{1\times2} & 1 \end{bmatrix} = \dfrac{1}{s_3}\begin{bmatrix} 1 & 1 & 0 \\ 1 & -1 & 0 \\ 0 & 0 & 1 \end{bmatrix}$ | $\dfrac{1}{s_3}\begin{bmatrix} W_{2,10} & 0_{2\times1} \\ 0_{1\times2} & 1 \end{bmatrix} = \dfrac{1}{s_3}\begin{bmatrix} 1 & 1 & 0 \\ j & -j & 0 \\ 0 & 0 & 1 \end{bmatrix}$ | | | | |

TABLE B

| Rank | TPMI index i | Index j | precoder matrix W' |
|---|---|---|---|
| 1 | 0-4 | 0-4 | $\frac{1}{s_1}\begin{bmatrix}1\\0_{2\times1}\end{bmatrix}=$ $\frac{1}{s_1}\begin{bmatrix}0\\W_{1,0}\end{bmatrix}=$ $\frac{1}{s_1}\begin{bmatrix}0\\W_{1,1}\end{bmatrix}=$ $\frac{1}{s_1}\begin{bmatrix}0\\W_{1,20}\end{bmatrix}=$ $\frac{1}{s_1}\begin{bmatrix}0\\W_{1,3}\end{bmatrix}=$ <br> $\frac{1}{s_1}\begin{bmatrix}1\\0\\0\end{bmatrix}$ $\frac{1}{s_1}\begin{bmatrix}0\\1\\1\end{bmatrix}$ $\frac{1}{s_1}\begin{bmatrix}0\\1\\-1\end{bmatrix}$ $\frac{1}{s_1}\begin{bmatrix}0\\1\\j\end{bmatrix}$ $\frac{1}{s_1}\begin{bmatrix}0\\1\\-j\end{bmatrix}$ |
| 2 | 5-10 | 0-5 | $\frac{1}{s_2}\begin{bmatrix}0_{1\times2}\\W_{2,0}\end{bmatrix}=$ $\frac{1}{s_2}\begin{bmatrix}0_{1\times2}\\W_{2,1}\end{bmatrix}=$ $\frac{1}{s_2}\begin{bmatrix}0&1\\W_{1,0}&0_{2\times1}\end{bmatrix}=$ $\frac{1}{s_2}\begin{bmatrix}0&1\\W_{1,1}&0_{2\times1}\end{bmatrix}=$ $\frac{1}{s_2}\begin{bmatrix}0&1\\W_{1,2}&0_{2\times1}\end{bmatrix}=$ $\frac{1}{s_2}\begin{bmatrix}0&1\\W_{1,3}&0_{2\times1}\end{bmatrix}=$ <br> $\frac{1}{s_2}\begin{bmatrix}0&0\\1&1\\1&-1\end{bmatrix}$ $\frac{1}{s_2}\begin{bmatrix}0&0\\1&1\\j&-j\end{bmatrix}$ $\frac{1}{s_2}\begin{bmatrix}0&1\\1&0\\1&0\end{bmatrix}$ $\frac{1}{s_2}\begin{bmatrix}0&1\\1&0\\-1&0\end{bmatrix}$ $\frac{1}{s_2}\begin{bmatrix}0&1\\1&0\\j&0\end{bmatrix}$ $\frac{1}{s_2}\begin{bmatrix}0&1\\1&0\\-j&0\end{bmatrix}$ |
| 3 | 11-12 | 0-1 | $\frac{1}{s_3}\begin{bmatrix}0_{1\times2}&1\\W_{2,0}&0_{2\times1}\end{bmatrix}=$ $\frac{1}{s_3}\begin{bmatrix}0_{1\times2}&1\\W_{2,0}&0_{2\times1}\end{bmatrix}=$ <br> $\frac{1}{s_3}\begin{bmatrix}0&0&1\\1&1&0\\1&-1&0\end{bmatrix}$ $\frac{1}{s_3}\begin{bmatrix}0&0&1\\1&1&0\\j&-j&0\end{bmatrix}$ |

TABLE C

| Rank | TPMI index i | Index j | precoder matrix W' |
|---|---|---|---|
| 1 | 0-4 | 0-4 | $\frac{1}{s_1}\begin{bmatrix}0\\1\\0\end{bmatrix}$ $\frac{1}{s_1}\begin{bmatrix}1\\0\\1\end{bmatrix}$ $\frac{1}{s_1}\begin{bmatrix}1\\0\\-1\end{bmatrix}$ $\frac{1}{s_1}\begin{bmatrix}1\\0\\j\end{bmatrix}$ $\frac{1}{s_1}\begin{bmatrix}1\\0\\-j\end{bmatrix}$ |
| 2 | 5-10 | 0-5 | $\frac{1}{s_2}\begin{bmatrix}1&1\\0&0\\1&-1\end{bmatrix}$ $\frac{1}{s_2}\begin{bmatrix}1&1\\0&0\\j&-j\end{bmatrix}$ $\frac{1}{s_2}\begin{bmatrix}1&0\\0&1\\1&0\end{bmatrix}$ $\frac{1}{s_2}\begin{bmatrix}1&0\\0&1\\-1&0\end{bmatrix}$ $\frac{1}{s_2}\begin{bmatrix}1&0\\0&1\\j&0\end{bmatrix}$ $\frac{1}{s_2}\begin{bmatrix}1&0\\0&1\\-j&0\end{bmatrix}$ |
| 3 | 11-12 | 0-1 | $\frac{1}{s_3}\begin{bmatrix}1&1&0\\0&0&1\\1&-1&0\end{bmatrix}$ $\frac{1}{s_3}\begin{bmatrix}1&1&0\\0&0&1\\j&-j&0\end{bmatrix}$ |

40 where $s_1$, $s_2$, and $s_3$ are scaling factors belonging to $[\sqrt{3},3]$.

14. The BS of claim 8, wherein the UL codebook for the 3 antenna ports includes full coherent (FC) precoding matrices comprising all non-zero entries, based on length-3 DFT vectors $$p_{1,i}=\begin{bmatrix}1\\e^{j\frac{2\pi l}{3O_1}}\\e^{j\frac{4\pi l}{3O_1}}\end{bmatrix},$$

$i=0, 1, \ldots, 3O_1-1$, where:
a rank 1 precoder is given by $$\frac{1}{\sqrt{3}}p_{1,i}$$

where $p_{1,i}$ is based on all of or a subset of the following table

| $O_1$ | $p_{1,0}$ | $p_{1,1}$ | $p_{1,2}$ | $p_{1,3}$ | $p_{1,4}$ | $p_{1,5}$ | $p_{1,6}$ | $p_{1,7}$ | $p_{1,8}$ | $p_{1,9}$ | $p_{1,10}$ | $p_{1,11}$ |
|---|---|---|---|---|---|---|---|---|---|---|---|---|
| 1 | $\begin{bmatrix}1\\1\\1\end{bmatrix}$ | $\begin{bmatrix}1\\e^{j2\pi\frac{1}{3}}\\e^{j2\pi\frac{2}{3}}\end{bmatrix}$ | $\begin{bmatrix}1\\e^{j2\pi\frac{2}{3}}\\e^{j2\pi\frac{4}{3}}\end{bmatrix}$ | | | | | | | | | |
| 2 | $\begin{bmatrix}1\\1\\1\end{bmatrix}$ | $\begin{bmatrix}1\\e^{j2\pi\frac{1}{6}}\\e^{j2\pi\frac{1}{3}}\end{bmatrix}$ | $\begin{bmatrix}1\\e^{j2\pi\frac{1}{3}}\\e^{j2\pi\frac{2}{3}}\end{bmatrix}$ | $\begin{bmatrix}1\\e^{j\pi}\\e^{j2\pi}\end{bmatrix}$ | $\begin{bmatrix}1\\e^{j2\pi\frac{2}{3}}\\e^{j2\pi\frac{4}{3}}\end{bmatrix}$ | $\begin{bmatrix}1\\e^{j2\pi\frac{5}{6}}\\e^{j2\pi\frac{5}{3}}\end{bmatrix}$ | | | | | | |

-continued

| $O_1$ | $P_{1,0}$ | $P_{1,1}$ | $P_{1,2}$ | $P_{1,3}$ | $P_{1,4}$ | $P_{1,5}$ | $P_{1,6}$ | $P_{1,7}$ | $P_{1,8}$ | $P_{1,9}$ | $P_{1,10}$ | $P_{1,11}$ |
|---|---|---|---|---|---|---|---|---|---|---|---|---|
| 4 | $\begin{bmatrix}1\\1\\1\end{bmatrix}$ | $\begin{bmatrix}1\\e^{j2\pi\frac{1}{12}}\\e^{j2\pi\frac{1}{6}}\end{bmatrix}$ | $\begin{bmatrix}1\\e^{j2\pi\frac{1}{6}}\\e^{j2\pi\frac{1}{3}}\end{bmatrix}$ | $\begin{bmatrix}1\\e^{j2\pi\frac{1}{4}}\\e^{j2\pi\frac{1}{2}}\end{bmatrix}$ | $\begin{bmatrix}1\\e^{j2\pi\frac{1}{3}}\\e^{j2\pi\frac{2}{3}}\end{bmatrix}$ | $\begin{bmatrix}1\\e^{j2\pi\frac{5}{12}}\\e^{j2\pi\frac{5}{6}}\end{bmatrix}$ | $\begin{bmatrix}1\\e^{j\pi}\\e^{j2\pi}\end{bmatrix}$ | $\begin{bmatrix}1\\e^{j2\pi\frac{7}{12}}\\e^{j2\pi\frac{7}{6}}\end{bmatrix}$ | $\begin{bmatrix}1\\e^{j2\pi\frac{2}{3}}\\e^{j2\pi\frac{4}{3}}\end{bmatrix}$ | $\begin{bmatrix}1\\e^{j2\pi\frac{3}{4}}\\e^{j2\pi\frac{3}{2}}\end{bmatrix}$ | $\begin{bmatrix}1\\e^{j2\pi\frac{5}{3}}\\e^{j2\pi\frac{10}{3}}\end{bmatrix}$ | $\begin{bmatrix}1\\e^{j2\pi\frac{11}{12}}\\e^{j2\pi\frac{11}{6}}\end{bmatrix}$ | a rank 2 precoding matrix is given by $$\frac{1}{\sqrt{6}}p_{2,i}$$

where $p_{2,i}$ is based on all of or a subset of the following table

| $O_1$ | $P_{2,0}$ | $P_{2,1}$ | $P_{2,2}$ | $P_{2,3}$ | $P_{2,4}$ | $P_{2,5}$ |
|---|---|---|---|---|---|---|
| 1 | $[p_{1,0}\,p_{1,1}]$ | $[p_{1,0}\,p_{1,2}]$ | $[p_{1,1}\,p_{1,2}]$ | | | |
| 2 | $[p_{1,0}\,p_{1,2}]$ | $[p_{1,0}\,p_{1,4}]$ | $[p_{1,2}\,p_{1,4}]$ | $[p_{1,1}\,p_{1,3}]$ | $[p_{1,1}\,p_{1,5}]$ | $[p_{1,3}\,p_{1,5}]$ |
| 4 | $[p_{1,0}\,p_{1,4}]$ | $[p_{1,0}\,p_{1,8}]$ | $[p_{1,4}\,p_{1,8}]$ | $[p_{1,1}\,p_{1,5}]$ | $[p_{1,1}\,p_{1,9}]$ | $[p_{1,5}\,p_{1,9}]$ |
| | $P_{2,6}$ | $P_{2,7}$ | $P_{2,8}$ | $P_{2,9}$ | $P_{2,10}$ | $P_{2,11}$ |
| | $[p_{1,2}\,p_{1,6}]$ | $[p_{1,2}\,p_{1,10}]$ | $[p_{1,6}\,p_{1,10}]$ | $[p_{1,3}\,p_{1,7}]$ | $[p_{1,3}\,p_{1,11}]$ | $[p_{1,7}\,p_{1,11}]$, | and a rank 3 precoding matrix is given by $$\frac{1}{3}p_{3,i}$$

where $p_{3,i}$ is based on all of or a subset of the following table

| $O_1$ | $P_{3,0}$ | $P_{3,1}$ | $P_{3,2}$ | $P_{3,3}$ |
|---|---|---|---|---|
| 1 | $[p_{1,0}\,p_{1,1}\,p_{1,2}]$ | | | |
| 2 | $[p_{1,0}\,p_{1,2}\,p_{1,4}]$ | $[p_{1,1}\,p_{1,3}\,p_{1,5}]$ | | |
| 4 | $[p_{1,0}\,p_{1,4}\,p_{1,8}]$ | $[p_{1,1}\,p_{1,5}\,p_{1,9}]$ | $[p_{1,2}\,p_{1,6}\,p_{1,10}]$ | $[p_{1,3}\,p_{1,7}\,p_{1,11}]$. |

15. A method performed by a user equipment (UE), the method comprising:

transmitting capability information about an uplink (UL) codebook for 3 antenna ports;

receiving a configuration indicating a sounding resource signal (SRS) resource set comprising at least one SRS resource with 4 SRS ports, wherein one of the 4 SRS ports is muted;

transmitting a SRS from 3 of the 4 SRS ports;

receiving an indication indicating a transmit precoding matrix indicator (TPMI) for transmission of a physical uplink shared channel (PUSCH); and transmitting the PUSCH based on the indicated TPMI, wherein the TPMI indicates a precoding matrix from the UL codebook for the 3 antenna ports, and wherein:

a payload of the TPMI=2 bits when maxRank=1, the payload of the TPMI=3 bits when maxRank=2 or 3, and maxRank is higher layer configured.

16. The method of claim 15, wherein the muted port is a fourth of the 4 SRS ports.

17. The method of claim 15, wherein the UL codebook for the 3 antenna ports includes non-coherent (NC) precoding matrices given by:

| Rank | TPMI index i | Precoder matrix W | | |
|---|---|---|---|---|
| 1 | 0-2 | $\frac{1}{\sqrt{3}}\begin{bmatrix}1\\0\\0\end{bmatrix}$ | $\frac{1}{\sqrt{3}}\begin{bmatrix}0\\1\\0\end{bmatrix}$ | $\frac{1}{\sqrt{3}}\begin{bmatrix}0\\0\\1\end{bmatrix}$ |
| 2 | 0-2 | $\frac{1}{\sqrt{3}}\begin{bmatrix}1&0\\0&1\\0&0\end{bmatrix}$ | $\frac{1}{\sqrt{3}}\begin{bmatrix}1&0\\0&0\\0&1\end{bmatrix}$ | $\frac{1}{\sqrt{3}}\begin{bmatrix}0&0\\1&0\\0&1\end{bmatrix}$ |
| 3 | 0 | $\frac{1}{\sqrt{3}}\begin{bmatrix}1&0&0\\0&1&0\\0&0&1\end{bmatrix}$. | | |

\*    \*    \*    \*    \*